United States Patent
Kishino

(10) Patent No.: US 9,030,768 B1
(45) Date of Patent: May 12, 2015

(54) CONTROLLER, DISK APPARATUS, AND CONTROL METHOD

(71) Applicant: Kabushiki Kaisha Toshiba, Minato-ku, Tokyo (JP)

(72) Inventor: Keiichi Kishino, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/467,527

(22) Filed: Aug. 25, 2014

Related U.S. Application Data

(60) Provisional application No. 61/981,405, filed on Apr. 18, 2014.

(51) Int. Cl.
*G11B 5/02* (2006.01)
*G11B 27/30* (2006.01)

(52) U.S. Cl.
CPC ...................................... *G11B 27/30* (2013.01)

(58) Field of Classification Search
None
See application file for complete search history.

(56) References Cited

U.S. PATENT DOCUMENTS

| | | | |
|---|---|---|---|
| 7,193,942 B2 | 3/2007 | Kanaoka | |
| 7,554,897 B2 | 6/2009 | Kanaoka | |
| 8,810,938 B1* | 8/2014 | Madden et al. | 360/27 |
| 2006/0077830 A1* | 4/2006 | Kanaoka | 369/47.28 |
| 2012/0063023 A1* | 3/2012 | Mathew et al. | 360/45 |
| 2012/0063284 A1* | 3/2012 | Mathew et al. | 369/53.44 |

FOREIGN PATENT DOCUMENTS

JP  5003327 B2  6/2012

* cited by examiner

*Primary Examiner* — Paul Huber
(74) *Attorney, Agent, or Firm* — Knobbe, Martens, Olson & Bear, LLP

(57) ABSTRACT

According to one embodiment, there is provided a controller including a write control unit. The write control unit is configured to control to, when writing data onto data regions of a magnetic disk, write sync marks to signify beginnings of the data regions such that the sync marks are periodically made different from each other for each neighboring tracks.

20 Claims, 15 Drawing Sheets

CONTROLLER, DISK APPARATUS, AND CONTROL METHOD

CROSS-REFERENCE TO RELATED APPLICATIONS

This application is based upon and claims the benefit of priority from Provisional Application No. 61/981,405, filed on Apr. 18, 2014; the entire contents of which are incorporated herein by reference.

FIELD

Embodiments described herein relate generally to a controller, disk apparatus, and control method.

BACKGROUND

In these years, in disk apparatuses such as hard disk apparatuses, the density of data stored on a magnetic disk tends toward being made higher. Accordingly the track pitch of the magnetic disk tends toward becoming narrower. When reading out data from a magnetic disk of a narrower track pitch by a magnetic head, if an off-track occurs in a track width direction, data written on the track may not be accurately read out. Or the occurrence of an off-track in a track width direction, when writing data onto a magnetic disk of a narrower track pitch by a magnetic head, results in the possibility that the data written onto the track may not be accurately read out when reading out the data by the magnetic head later.

DETAILED DESCRIPTION

In general, according to one embodiment, there is provided a controller including a write control unit. The write control unit is configured to control to, when writing data onto data regions of a magnetic disk, write sync marks to signify beginnings of the data regions such that the sync marks are periodically made different from each other for each neighboring tracks.

Exemplary embodiments of a disk apparatus will be explained below in detail with reference to the accompanying drawings. The present invention is not limited to the following embodiments.

First Embodiment

Figure 1:
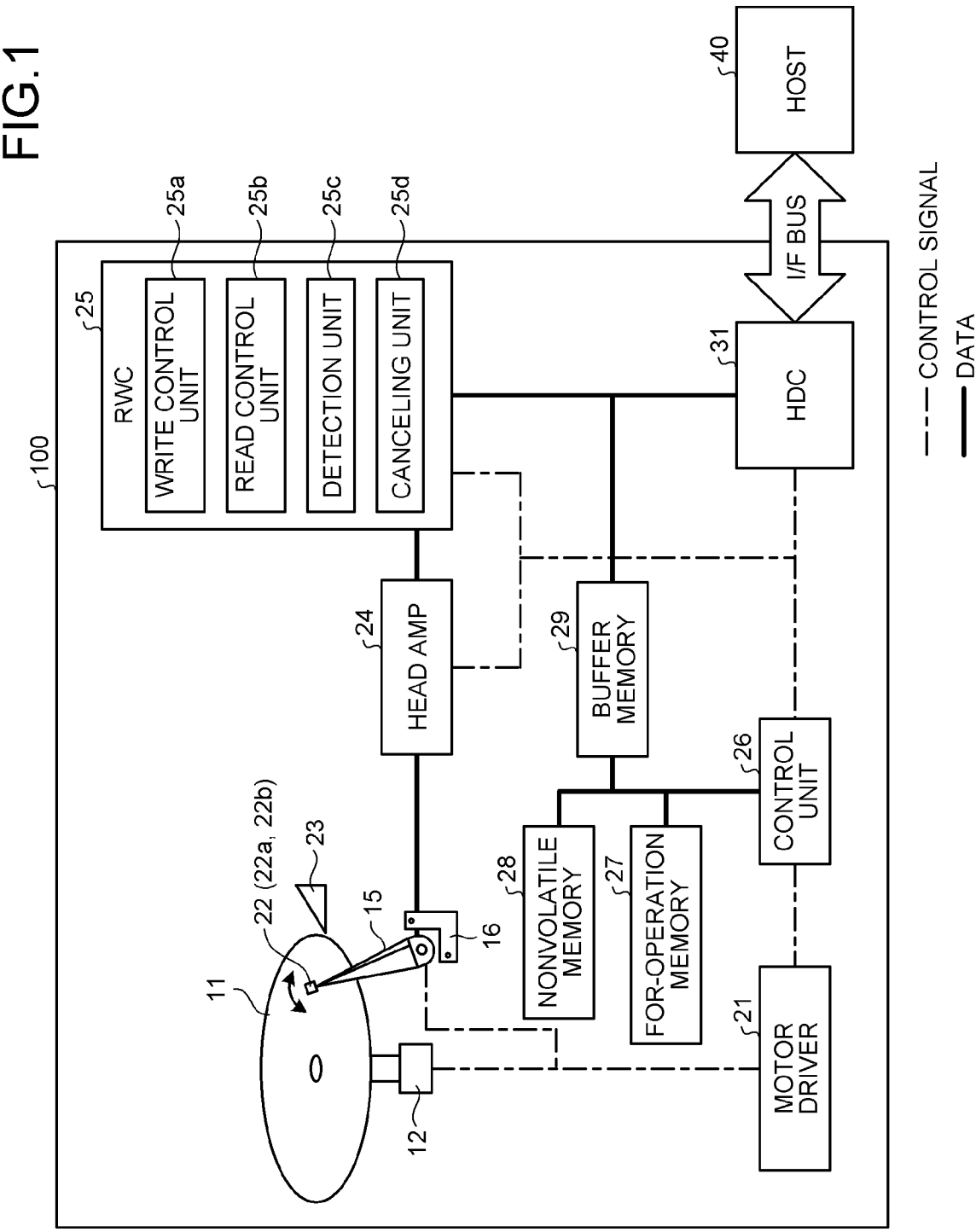
FIG. 1 is a diagram showing configuration of a disk apparatus according to a first embodiment.

A disk apparatus 100 according to the first embodiment will be described using FIG. 1. FIG. 1 is a diagram showing configuration of the disk apparatus 100.

The disk apparatus 100 is an apparatus which records information onto a magnetic disk (disk medium) 11 via a magnetic head 22 and which reads a signal from the magnetic disk (disk medium) 11 via the magnetic head 22, and is, for example, a magnetic disk apparatus (e.g., a hard disk apparatus). Specifically, the disk apparatus 100 comprises a magnetic disk 11, a spindle motor 12, a motor driver 21, a magnetic head 22, an actuator arm 15, a voice coil motor (VCM) 16, a ramp 23, a head amplifier 24, a read/write channel (RWC) 25, a hard disk controller (HDC) 31, a buffer memory 29, and a control unit 26.

The magnetic disk 11 is rotated around a rotation axis as the center at predetermined rotation speed by a spindle motor 12. The rotation of the spindle motor 12 is driven by a motor driver 21.

The magnetic head 22 writes and reads data onto and from the magnetic disk 11 by a recording head 22a and a read head 22b that the magnetic head includes. The magnetic head 22 is located at the end of the actuator arm 15 and moved along a radial direction (track width direction) of the magnetic disk 11 by the voice coil motor 16 driven by the motor driver 21. When the rotation of the magnetic disk 11 is stopped, and so on, the magnetic head 22 is evacuated onto the ramp 23.

The head amplifier 24 amplifies the signal read by the magnetic head 22 from the magnetic disk 11 to output and supply to the read/write channel 25. Further, the head amplifier 24 amplifies a signal supplied from the read/write channel 25 to write data onto the magnetic disk 11 to supply to the magnetic head 22.

The hard disk controller 31 performs control of transmission and reception of data to and from a host computer 40 via an I/F bus, control of the buffer memory 29, a data error correction process on record data, and so on. The buffer memory 29 is used as a cache for data which is to be transmitted or received to and from the host computer 40. Further, the buffer memory 29 is used for temporarily storing data read from the magnetic disk 11, data to be written onto the magnetic disk 11, or control firmware read from the magnetic disk 11, and so on.

The read/write channel 25 code-modulates data to be written onto the magnetic disk 11 supplied from the hard disk controller 31 to supply to the head amplifier 24. Further, the read/write channel 25 code-demodulates the signal read from the magnetic disk 11 and supplied from the head amplifier 24 into digital data to output to the hard disk controller 31.

An operational-purpose memory 27 (e.g., an SRAM: Static Random Access Memory), a nonvolatile memory 28 (e.g., a Flash ROM: Flash Read Only Memory), and a temporary-storage-purpose buffer memory 29 (e.g., a DRAM: Dynamic Random Access Memory) are connected to the control unit 26. The control unit 26 controls the magnetic disk apparatus 100 comprehensively according to firmware stored beforehand in the nonvolatile memory 28 and the magnetic disk 11. The firmware includes initial firmware and control firmware used in usual operation. The initial firmware first executed at startup is stored in, e.g., the nonvolatile memory 28. The control firmware used in usual operation is stored on the magnetic disk 11 and read from the magnetic disk 11 to be temporarily stored in the buffer memory 29 through control according to the initial firmware and then is stored in the operational-purpose memory 27.

Figure 2:
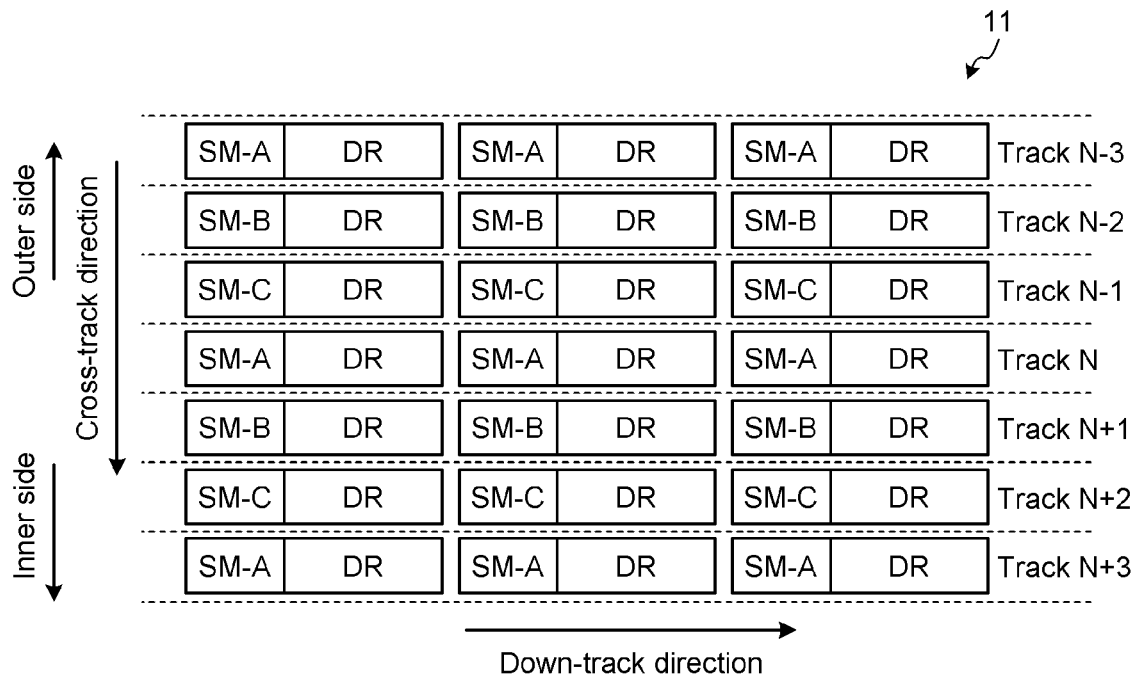
FIG. 2 is a diagram showing configuration of a magnetic disk in the first embodiment.

In the disk apparatus 100, data is written onto multiple tracks in a concentric-circle shape provided on the magnetic disk 11 in the order of from the inner side to the outer side or from the outer side to the inner side by the recording head 22a (see FIG. 2). For example, the read/write channel 25 controls the recording head 22a to write a sync mark SM, which signifies the beginning of a data region DR onto which to write data in a track subject to writing, before the data region DR. That is, each track in the magnetic disk 11 includes multiple sectors. Each sector includes the sync mark SM and the data region DR. The sync mark SM signifies the beginning of the data region DR in the sector.

In the disk apparatus 100, the read head 22b is positioned over a target track to read data from the target track. For example, the read/write channel 25 detects a sync mark SM in the signal read from the target track subject to reading to recognize the beginning of a data region DR and acquire data from the recognized data region DR. The bit pattern of the sync mark SM is decided on to be distinguishable from the bit patterns of data to be stored on the data region DR, and hence the sync mark SM can be detected if the bit pattern is recognized correctly.

However, in the disk apparatus 100, in order to increase the recording capacity of the magnetic disk 11, that is, in order to improve the recording density of the magnetic disk 11, the track width (track pitch) of the magnetic disk 11 may be as narrow as the width of the read head 22b. In the disk apparatus 100, for example, where the track width of the magnetic disk 11 is as narrow as the width of the read head 22b, when reading by the read head 22b, the read head 22b may be off-track in a track width direction to be offset toward an adjacent track from a position within the target track. Or, for example, where, in writing data onto an adjacent track, the recording head 22a was writing data with being off-track in a track width direction toward the target track, in reading by the read head 22b, the read head 22b may suffer interference from data on the adjacent track, even if the read head 22b is in a position within the target track, without being off-track.

As such, if the track width (track pitch) of the magnetic disk 11 is as narrow as the width of the read head 22b, then the signal read from a target track contains interference from an adjacent track, and thus it is difficult to correctly recognize that bit pattern from the signal read from the target track. Hence, it may be difficult to detect the sync mark SM of the target track.

Accordingly, in the first embodiment, in the disk apparatus 100, by writing data onto data regions DR while writing sync marks SM that are periodically made different for each track, the sync marks SM of the target track are made detectable and distinguishable from the sync marks SM of adjacent tracks in signal reading.

Specifically, the read/write channel (controller) 25 has a write control unit 25a, a read control unit 25b, a detection unit 25c, and a canceling unit 25d. The write control unit 25a controls the recording head 22a to write data onto data regions DR while writing sync marks SM, which are periodically made different for each track, to signify the beginnings of data regions in the magnetic disk 11. In order to make the sync marks SM of the target track distinguishable from the sync marks SM of the adjacent track on the outer side along a cross-track direction and the sync marks SM of the adjacent track on the inner side along the cross-track direction, three or more different types of patterns (bit patterns) of the sync mark SM can be prepared. For example, sync-mark-candidate pattern information including three or more different types of patterns (bit patterns) of the sync mark SM is written beforehand on a management information storing area of the magnetic disk 11, and the write control unit 25a may read the sync-mark-candidate pattern information from the management information storing area of the magnetic disk 11.

The write control unit 25a performs control to select one from three or more types of patterns of the sync mark SM cyclically at track periods to write before data regions DR. The three or more types of patterns of the sync mark SM are distinguishable from patterns of data to be written on data regions DR and are different in pattern from each other. Further, the write control unit 25a may generate sync-mark management information where identifiers of multiple tracks and identifiers of the patterns of written sync marks SM are associated with the tracks to write onto the management information storing area of the magnetic disk 11.

For example, as shown in FIG. 2, the write control unit 25a, switching between the patterns of three sync marks SM-A, SM-B, SM-C during every three track periods, writes the pattern ahead of each data region DR when writing data onto data regions DR. FIG. 2 is a diagram showing the configuration of the magnetic disk 11. As the patterns of three sync marks SM-A to SM-C, patterns between which enough Euclidean distances are secured can be selected and set independently. Further, the number of bits of the sync mark patterns SM-A to SM-C is not limited but can be decided on freely.

In the case shown in FIG. 2, the pattern of the sync mark SM-B of track N−2 is different from both the pattern of the sync mark SM-A of adjacent track N−3 on the outer side along the cross-track direction and the pattern of the sync mark SM-C of adjacent track N−1 on the inner side along the cross-track direction. The pattern of the sync mark SM-A of track N is different from both the pattern of the sync mark SM-C of adjacent track N−1 on the outer side along the cross-track direction and the pattern of the sync mark SM-B of adjacent track N+1 on the inner side along the cross-track direction. The pattern of the sync mark SM-C of track N+2 is different from both the pattern of the sync mark SM-B of adjacent track N+1 on the outer side along the cross-track direction and the pattern of the sync mark SM-A of adjacent track N+3 on the inner side along the cross-track direction. That is, when paying attention to a given track, the pattern of the sync mark SM of the given track is distinguishable from both the patterns of the sync marks of the adjacent tracks on opposite sides along the cross-track direction.

The read control unit 25b controls the read head 22b to read a signal from a target track. The read control unit 25b has an FIR filter (not shown) and performs waveform equalization by the FIR filter on the read signal. The read control unit 25b supplies waveform samples after the equalization (data FIR output), as a signal read from the target track, to the detection unit 25c. Further, the read control unit 25b reads the sync-mark management information from the management information storing area of the magnetic disk 11 by the read head 22b to supply to the detection unit 25c.

The detection unit 25c detects each of the sync mark of the target track and the sync marks of adjacent tracks in the signal read from the target track. For example, the control unit 26 sets target values (ideal values) for the three sync marks SM-A, SM-B, SM-C used when writing data in the detection unit 25c. The detection unit 25c identifies which one of the three sync marks SM-A, SM-B, SM-C is written on each track based on the sync-mark management information and sets a target value of the identified sync mark for each track.

The detection unit 25c sets a sync mark detection window (see a sync mark detection window W shown in FIG. 8) for the waveform samples after the equalization (data FIR output). The detection unit 25c calculates a Euclidean distance (detected distance) from the ideal value of the sync mark SM at each time in the sync mark detection window. Also, the detection unit 25c repeats displacing, in position, the sync mark detection window for the waveform samples after the equalization and calculating a Euclidean distance from the ideal value of the sync mark SM.

Whereas the ideal value of the sync mark SM is an ideal rectangular wave pattern corresponding to the bit pattern of the sync mark SM, the waveform samples after the equalization has a deterioration in shape to deviate from the ideal rectangular wave pattern. Here, since the pattern of the sync mark SM is decided on so as to be distinguishable from the patterns of data to be written onto data regions DR, it is expected that if the sync mark detection window is offset from the position of the sync mark SM, then Euclidean distances from the ideal value exceed a threshold. On the other hand, it is expected that if the sync mark detection window matches the position of the sync mark SM, then Euclidean distances from the ideal value are smaller than the threshold.

The detection unit 25c detects a position at which the Euclidean distance is smaller than or equal to the threshold as a sync mark position. If it can detect a sync mark position, the detection unit 25c outputs the Euclidean distance and detection time stamp of this time. If it fails to detect a sync mark position, the detection unit 25c outputs the minimum Euclidean distance calculated during the sync mark detection window and the time stamp of the minimum point.

In the present embodiment, as shown in FIG. 2, the detection of the pattern of the sync mark SM of a target track to be read and the detection of the patterns of the sync marks SM of adjacent tracks on opposite sides of the target track are performed in parallel. For example, if the target track is track N, for the signal read from the track N, the detection of the sync mark SM-A of the track N, the detection of the sync mark SM-C of adjacent track N−1 on the outer side, and the detection of the sync mark SM-B of adjacent track N+1 on the inner side are performed in parallel.

Figure 3:
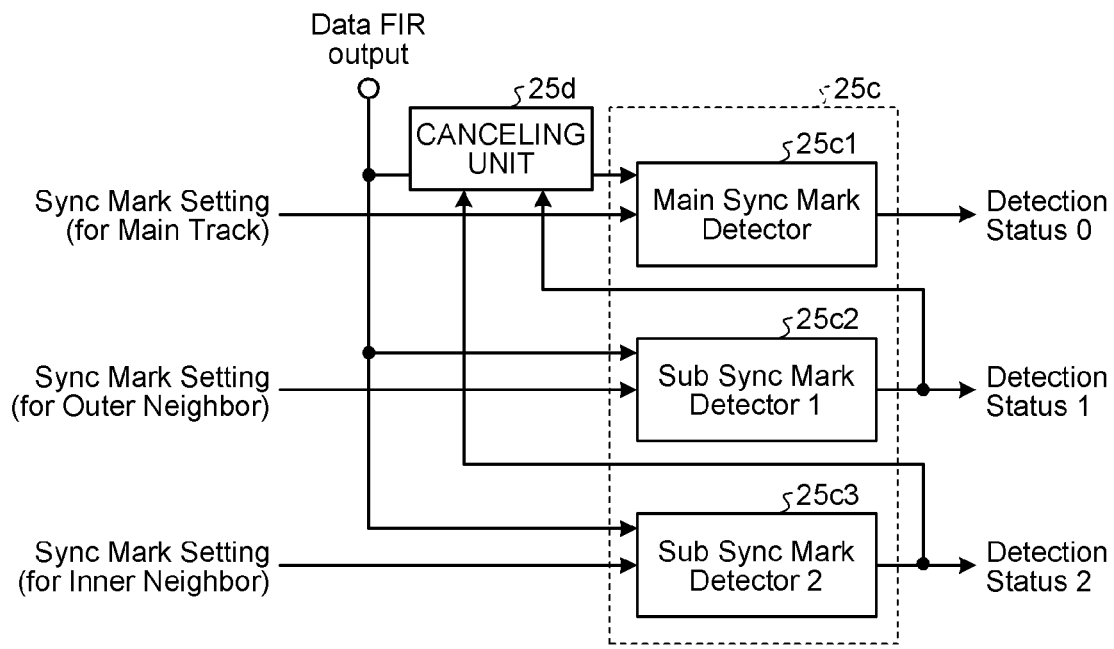
FIG. 3 is a diagram showing configuration of a detection unit in the first embodiment.

Specifically, the detection unit 25c has multiple sync mark detectors 25c1 to 25c3 for the main track (target track) and sub-tracks (adjacent tracks) as shown in FIG. 3. The sync mark detector 25c1 detects the sync mark SM of the main track (target track). The target for the sync mark SM of the target track is set in the sync mark detector 25c1 (Sync Mark Setting for Main Track). The sync mark detector 25c1 receives the signal (data FIR output) read from the target track via the canceling unit 25d and calculates a Euclidean distance, indicating the degree of deviation from the target (ideal value) of the sync mark SM of the target track, for the received signal. The sync mark detector 25c1 outputs the calculated Euclidean distance (detected distance) as a detection status 0.

The sync mark detector 25c2 detects the sync mark SM of a sub-track (adjacent track on the outer side). The target for the sync mark SM of the adjacent track on the outer side is set in the sync mark detector 25c2 (Sync Mark Setting for Outer Neighbor). The sync mark detector 25c2 receives the signal (data FIR output) read from the target track and calculates a Euclidean distance, indicating the degree of deviation from the target (ideal value) of the sync mark SM of the adjacent track on the outer side, for the received signal. The sync mark detector 25c2 outputs the calculated Euclidean distance (detected distance) as a detection status 1.

The sync mark detector 25c3 detects the sync mark SM of a sub-track (adjacent track on the inner side). The target for the sync mark SM of the adjacent track on the inner side is set in the sync mark detector 25c3 (Sync Mark Setting for Inner Neighbor). The sync mark detector 25c3 receives the signal (data FIR output) read from the target track and calculates a Euclidean distance, indicating the degree of deviation from the target (ideal value) of the sync mark SM of the adjacent track on the inner side, for the received signal. The sync mark detector 25c3 outputs the calculated Euclidean distance (detected distance) as a detection status 2.

Under conditions of narrow track pitches, the signal (data FIR output) read from the target track is subjected to the influence of adjacent data, so that the signal may contain an interference component from an adjacent track. If this signal is input as it is to the sync mark detector 25c1, the accuracy in detection of the sync mark SM by the sync mark detector 25c1 may decrease. Accordingly, in the configuration of FIG. 3, the signal (data FIR output) read from the target track, after going through the canceling unit 25d, is input to the sync mark detector 25c1. In this configuration, a canceling process using the target values of the known sync marks of the adjacent tracks is performed on FIR samples, and sync-mark detection is performed on the sample values after the cancellation. The detected results of the sync mark detectors for the sub-tracks are input to the canceling circuit, which performs an ITI (Inter-Track Interference) canceling process. This canceling process can be performed on-the-fly, and also it is possible to read the signals of the adjacent tracks and separately to perform the canceling process using the sample values by off-line processing.

That is, the canceling unit 25d cancels the interference components corresponding to the sync marks of the adjacent tracks from the signal corresponding to the sync mark of the target track according to the detected results of the detection unit 25c. For example, the canceling unit 25d removes interference components, obtained from the targets of the sync marks of the adjacent tracks, from the signal corresponding to the sync mark of the target track. These interference components can be obtained by multiplying the target of the sync mark of the adjacent track by a gain coefficient corresponding to the detected result (detection status) of the detection unit 25c. Or, for example, the canceling unit 25d removes interference components, obtained from the signals corresponding to the sync marks of the adjacent tracks, from the signal corresponding to the sync mark of the target track. These interference components can be obtained by multiplying the signal read from the adjacent track by a gain coefficient corresponding to the detected result (detection status) of the detection unit 25c.

Figure 4:
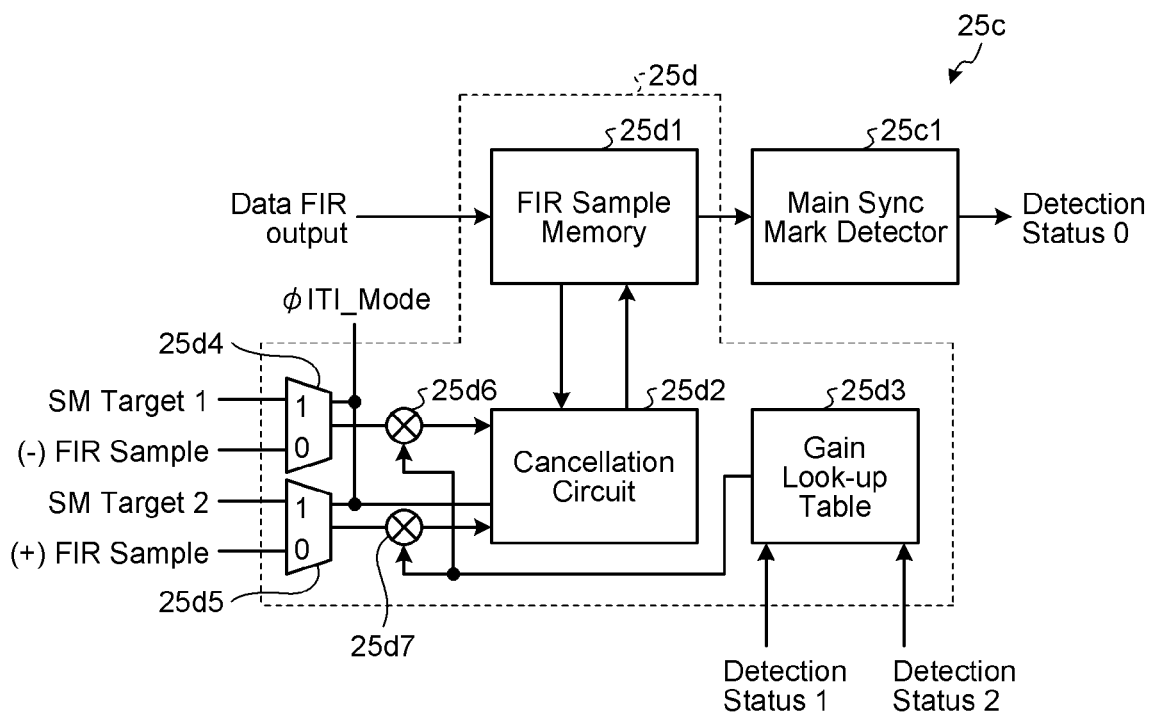
FIG. 4 is a diagram showing configuration of a canceling unit in the first embodiment.

Specifically, the canceling unit 25d has a memory (FIR sample memory) 25d1, a canceling circuit 25d2, a gain lookup table 25d3, selectors 25d4, 25d5, and multipliers 25d6, 25d7 as shown in FIG. 4. FIG. 4 is a diagram showing the configuration of the canceling unit 25d.

The memory 25d1 receives the waveform samples after the equalization (data FIR output) as the signal read from the target track from the FIR filter (not shown). The memory 25d1 temporarily holds the received signal and supplies the held signal to the canceling circuit 25d2.

The gain lookup table 25d3 receives the detected result (detection status 1) of the sync mark detector 25c2 and the detected result (detection status 2) of the sync mark detector 25c3. In the gain lookup table 25d3, for multiple combinations of a candidate value for the detection status 1 and a candidate value for the detection status 2, gain coefficients are associated with the values of the detection status 1 and of the detection status 2. The gain lookup table 25d3 supplies the gain coefficients corresponding to the received values of the detection status 1 and of the detection status 2 to the multipliers 25d6, 25d7.

The selector 25d4 selects either the target value "SM Target 1" of the sync mark of the adjacent track on the outer side or the signal "(−) FIR Sample" read from the adjacent track on the outer side according to an interference mode signal φITI_Mode. The target value "SM Target 1" of the sync mark of the adjacent track on the outer side is set according to the bit pattern of the sync mark of the adjacent track on the outer side by the control unit 26. The signal "(−) FIR Sample" is a signal read from the adjacent track on the outer side by the read head and stored in the buffer memory 29. The selector 25d5 selects either the target value "SM Target 2" of the sync mark or the signal "(+) FIR Sample" read from the adjacent track on the inner side according to the interference mode signal φITI_Mode. The target value "SM Target 2" of the sync mark of the adjacent track on the inner side is set according to the bit pattern of the sync mark of the adjacent track on the inner side by the control unit 26. The signal "(+) FIR Sample" is a signal read from the adjacent track on the inner side by the read head and stored in the buffer memory 29.

For example, where the canceling unit 25d removes interference components from the signal corresponding to the sync mark of the target track based on the target values of the sync marks of the adjacent tracks, the control unit 26 supplies the interference mode signal φITI_Mode=1 to the selectors 25d4, 25d5. In this case, the selector 25d4 selects the target value "SM Target 1" of the sync mark of the adjacent track on the outer side to supply to the multiplier 25d6, and the selector 25d5 selects the target value "SM Target 2" of the sync mark of the adjacent track on the inner side to supply to the multiplier 25d7.

Or, for example, in the case where the canceling unit 25d removes interference components from the signal corresponding to the first sync mark based on the signals corresponding to the second sync marks read from the adjacent tracks, the control unit 26 supplies the interference mode signal φITI_Mode=0 to the selectors 25d4, 25d5. In this case, the selector 25d4 selects the signal "(−) FIR Sample" read from the adjacent track on the outer side to supply to the multiplier 25d6, and the selector 25d5 selects the signal "(+) FIR Sample" read from the adjacent track on the inner side to supply to the multiplier 25d7.

The multiplier 25d6 multiplies the target value or signal supplied from the selector 25d4 by a gain coefficient supplied from the gain lookup table 25d3. The multiplier 25d6 supplies the multiplying result as the interference component from the adjacent track on the outer side to the canceling circuit 25d2.

The multiplier 25d7 multiplies the target value or signal supplied from the selector 25d5 by a gain coefficient supplied from the gain lookup table 25d3. The multiplier 25d7 supplies the multiplying result as the interference component from the adjacent track on the inner side to the canceling circuit 25d2.

The canceling circuit 25d2 receives the signal read from the target track from the memory 25d1, the interference component from the adjacent track on the outer side from the multiplier 25d6, and the interference component from the adjacent track on the inner side from the multiplier 25d7. The canceling circuit 25d2 performs the ITI canceling process to remove the interference component from the adjacent track on the outer side and the interference component from the adjacent track on the inner side from the signal of the target track. The canceling circuit 25d2 returns the signal after the ITI canceling process to the memory 25d1. Thus, the signal after the ITI canceling process is supplied to the sync mark detector 25c1.

Figure 5:
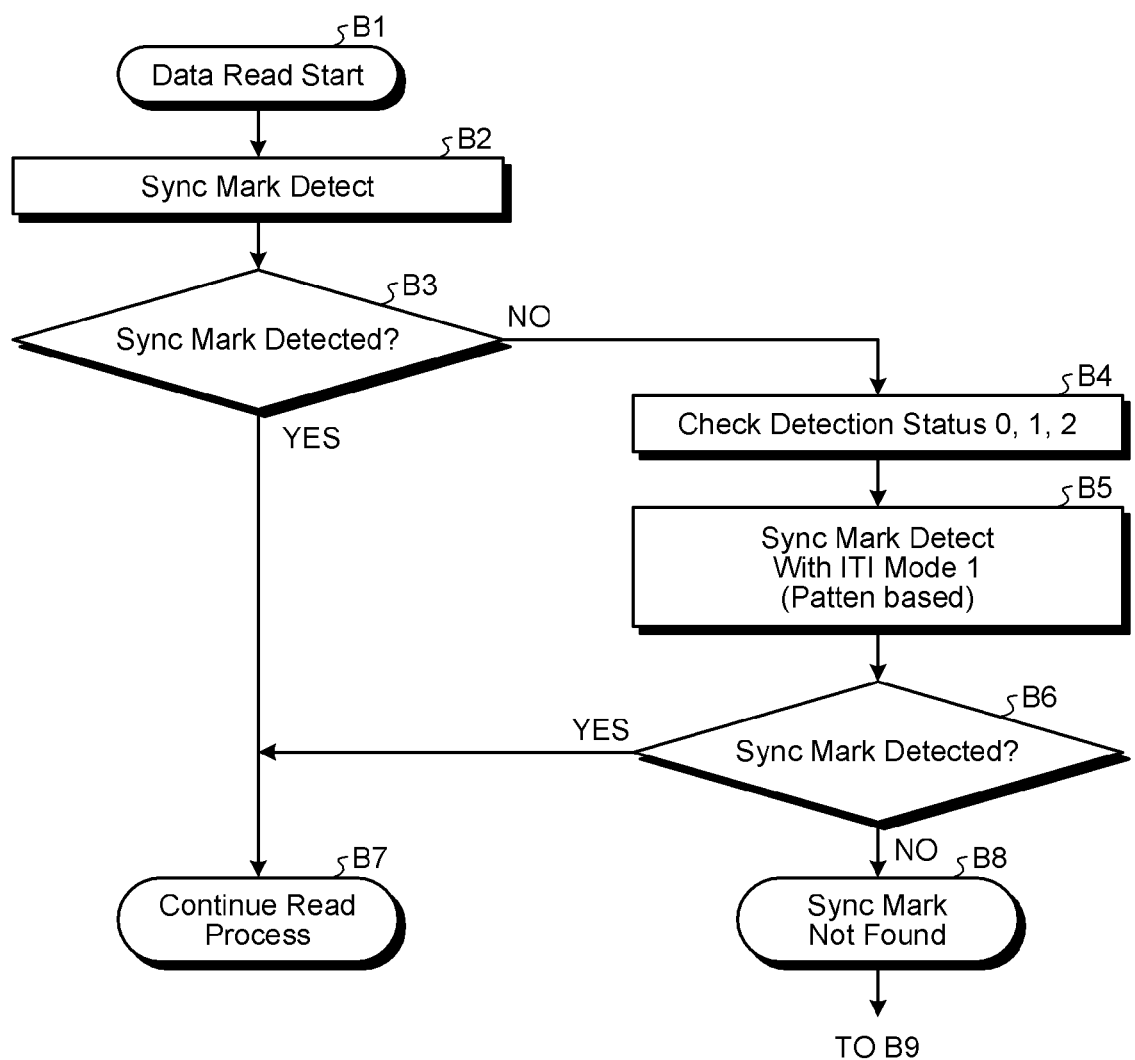
FIG. 5 is a flow chart showing operation of the disk apparatus according to the first embodiment.
Figure 6:
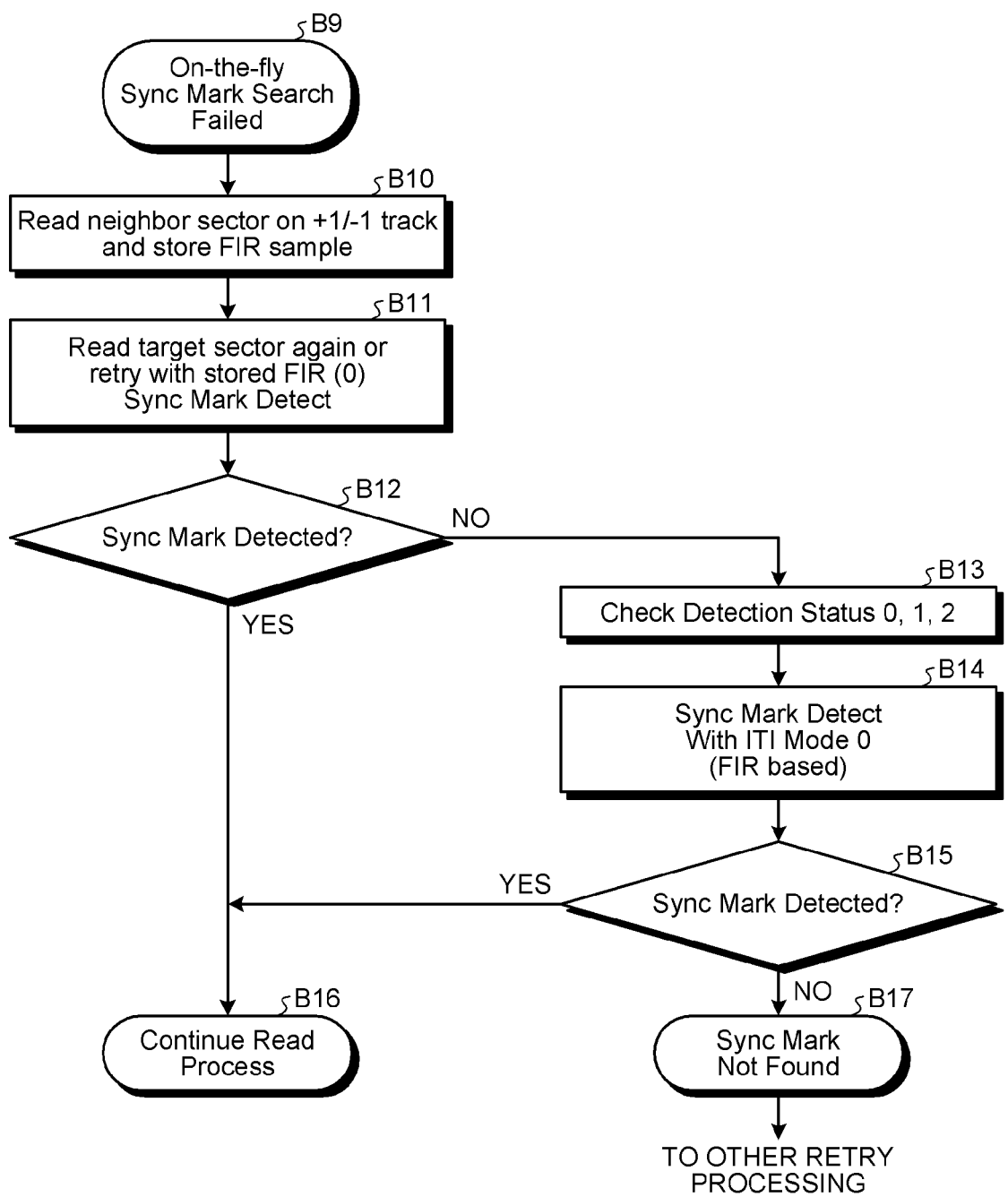
FIG. 6 is a flow chart showing operation of the disk apparatus according to the first embodiment.

Next, the operation of the disk apparatus 100 will be described using FIGS. 5 and 6. FIGS. 5 and 6 are a flow chart showing the operation of the disk apparatus 100.

FIG. 5 shows the flow of canceling the influence of the sync marks of the adjacent tracks on-the-fly to detect the sync mark SM of the target track. The disk apparatus 100 starts reading data (B1) and detects each of the sync mark of the target track and the sync marks of the adjacent tracks from the signal read from the target track (B2). The disk apparatus 100 repeats displacing, in position, the sync mark detection window for the waveform samples after the equalization and calculating a Euclidean distance from the ideal value of the sync mark SM to detect a position at which the Euclidean distance is smaller than or equal to a threshold as a sync mark position.

The disk apparatus 100 determines whether it succeeded in detecting the sync mark of the target track (B3). If having succeeded in detecting the sync mark of the target track (Yes at B3), the disk apparatus 100 continues the subsequent reading (B7). For example, the disk apparatus 100 identifies the data region DR with respect to the sync mark SM and acquires data from the data region DR.

If having failed in detecting the sync mark of the target track (No at B3), then the disk apparatus 100 checks and acquires the detection status 0, the detection status 1, and the detection status 2 of that time for the main (0), sub 1 (−), and sub 2 (+) (B4). The disk apparatus 100 sets the interference mode signal φITI_Mode to 1 and performs the ITI canceling process on the signal of the target track to remove interference components, obtained from the target values of the sync marks of the adjacent tracks on opposite sides, from the signal corresponding to the sync mark of the target track (B5). These interference components can be obtained by multiplying the target values "SM Target 1", "SM Target 2" of the sync marks by gain coefficients corresponding to the detection status 1 and detection status 2 acquired at B4 respectively.

The disk apparatus 100 performs the detection of the sync mark of the target track on the signal after the ITI canceling process again (B5). Then the disk apparatus 100 determines whether it succeeded in detecting the sync mark of the target track (B6). If having succeeded in detecting the sync mark of the target track (Yes at B6), the disk apparatus 100 continues the subsequent reading (B7).

If having failed in detecting the sync mark of the target track (No at B6), then the disk apparatus 100 considers that the sync mark SM was not found (B8) to make the process proceed to B9 in FIG. 6. For example, if the signal of the sync mark of the target track is unreadable, or the signal of the sync mark of the target track can be read but cannot be decoded, the disk apparatus 100 can determine that it failed in detecting the sync mark of the target track. The case where the signal of the sync mark of the target track is unreadable is, for example, the case where a position at which the Euclidean distance is smaller than or equal to the threshold is not found at B2.

FIG. 6 shows the flow of performing the ITI canceling process using FIR output samples of the adjacent tracks on opposite sides as the source of a canceling waveform to detect the sync mark SM of the target track. This flow needs reading from the adjacent tracks on opposite sides, and hence it is recommended to execute the flow for retry processing when having failed in detecting on-the-fly (the flow of FIG. 5).

When having failed in detecting the sync mark SM on-the-fly (B9), the disk apparatus 100 acquires FIR sample values of the adjacent tracks on opposite sides of the target track and in parallel with this stores the signal after the ITI canceling process at B5 in a memory (B10). The disk apparatus 100 reads the signal from the target track again and performs the detection of the sync mark of the target track on the read signal again. Or the disk apparatus 100 again performs the detection of the sync mark of the target track on the signal (FIR samples) already read from the target track and stored in a memory (B11). Then the disk apparatus 100 determines whether it succeeded in detecting the sync mark of the target track (B12). If having succeeded in detecting the sync mark of the target track (Yes at B12), the disk apparatus 100 continues the subsequent reading (B16). For example, the disk apparatus 100 identifies the data region DR with respect to the sync mark SM and acquires data from the data region DR.

If having failed in detecting the sync mark of the target track (No at B12), then the disk apparatus 100 acquires the detection status 0, the detection status 1, and the detection status 2 of that time for the main (0), sub 1 (−), and sub 2 (+) (B13). The disk apparatus 100 sets the interference mode signal φITI_Mode to 0 and performs the ITI canceling process on the signal of the target track to remove interference components, obtained from the signals of the adjacent tracks on opposite sides, from the signal corresponding to the sync mark of the target track (B14). These interference components can be obtained by multiplying the signals "(−) FIR Sample", "(+) FIR Sample" of the adjacent tracks by gain coefficients corresponding to the detection status 1 and detection status 2 acquired at B4 respectively.

The disk apparatus 100 again performs the detection of the sync mark of the target track on the signal after the ITI canceling process (B14). The disk apparatus 100 determines whether it succeeded in detecting the sync mark of the target track (B15). If having succeeded in detecting the sync mark of the target track (Yes at B15), the disk apparatus 100 continues the subsequent reading (B16).

If having failed in detecting the sync mark of the target track (No at B15), then the disk apparatus 100 considers that the sync mark SM was not found (B17) to perform other retry processing (e.g., an offset reading process).

As described above, in the first embodiment, in the disk apparatus 100, the write control unit 25a, when writing data onto data regions DR, writes sync marks SM to signify the beginnings of data regions DR in the magnetic disk 11 such that the sync marks SM are periodically made different from each other for each track. Thus, the disk apparatus 100 can detect the sync marks SM of the target track with distinguishing from the sync marks SM of the adjacent tracks under conditions of narrow track pitches when reading signals.

Further, in the first embodiment, in the disk apparatus 100, the detection unit 25c detects the sync marks of the target track and the sync marks of the adjacent tracks from the signal of the target track, respectively. Thus, the disk apparatus 100 can perform the ITI canceling process to cancel the interference components corresponding to the sync marks of the adjacent tracks from the signal corresponding to the sync mark of the target track before the detection of the sync mark of the target track.

Yet further, in the first embodiment, in the disk apparatus 100, the canceling unit 25d cancel the interference components corresponding to the sync marks of the adjacent tracks from the signal corresponding to the sync mark of the target track according to the detected result (detected distance) of the detection unit 25c. For example, the canceling unit 25d removes the interference components, obtained from the target values of the sync marks of the adjacent tracks, from the signal corresponding to the sync mark of the target track. Or, for example, the canceling unit 25d removes the interference components, obtained from the signals read from the adjacent tracks and corresponding to the sync marks of the adjacent tracks, from the signal corresponding to the sync mark of the target track. Thus, the influence of the adjacent tracks on the signal corresponding to the sync mark of the target track can be canceled, and hence accuracy in detecting the sync mark of the target track can be improved. Therefore, accuracy in determining the read start position of the data region with respect to the sync mark of the target track can also be improved, thus improving the quality of read data.

It should be noted that, although FIG. 3 illustrates the case where the sync mark detectors for sub-tracks (adjacent tracks) are implemented as circuits, the sync mark detectors for sub-tracks (adjacent tracks) may be implemented as functional modules that are executed by the control unit 26 according to firmware for control.

Although the canceling unit 25d shown in FIG. 4 determines the degree of interference from the sync marks of the adjacent tracks on opposite sides using the gain lookup table 25d3, it may measure correlations between the sync mark pattern of the target track and the sync mark patterns of the adjacent tracks on opposite sides, thereby determining the degree of interference.

Although the canceling unit 25d shown in FIG. 4 uses common gain coefficients for the mode which performs ITI canceling using target values (mode of the interference mode signal φITI_Mode=1) and the mode which performs ITI canceling using FIR sample values (mode of the interference mode signal φITI_Mode=0), the gain lookup table 25d3 may change the gain coefficients according to the interference mode signal.

Second Embodiment

Next, a disk apparatus 200 according to the second embodiment will be described. With description of similar configuration to in the first embodiment being simplified or omitted, description will be made below focusing on different configurations.

When trying to detect the sync mark of the target track, if an error occurs (e.g., as in B17 of FIG. 6), the disk apparatus 200 performs, for retry processing, the offset reading process making the read head 22b offset in a track width direction when reading signals.

Figure 7:
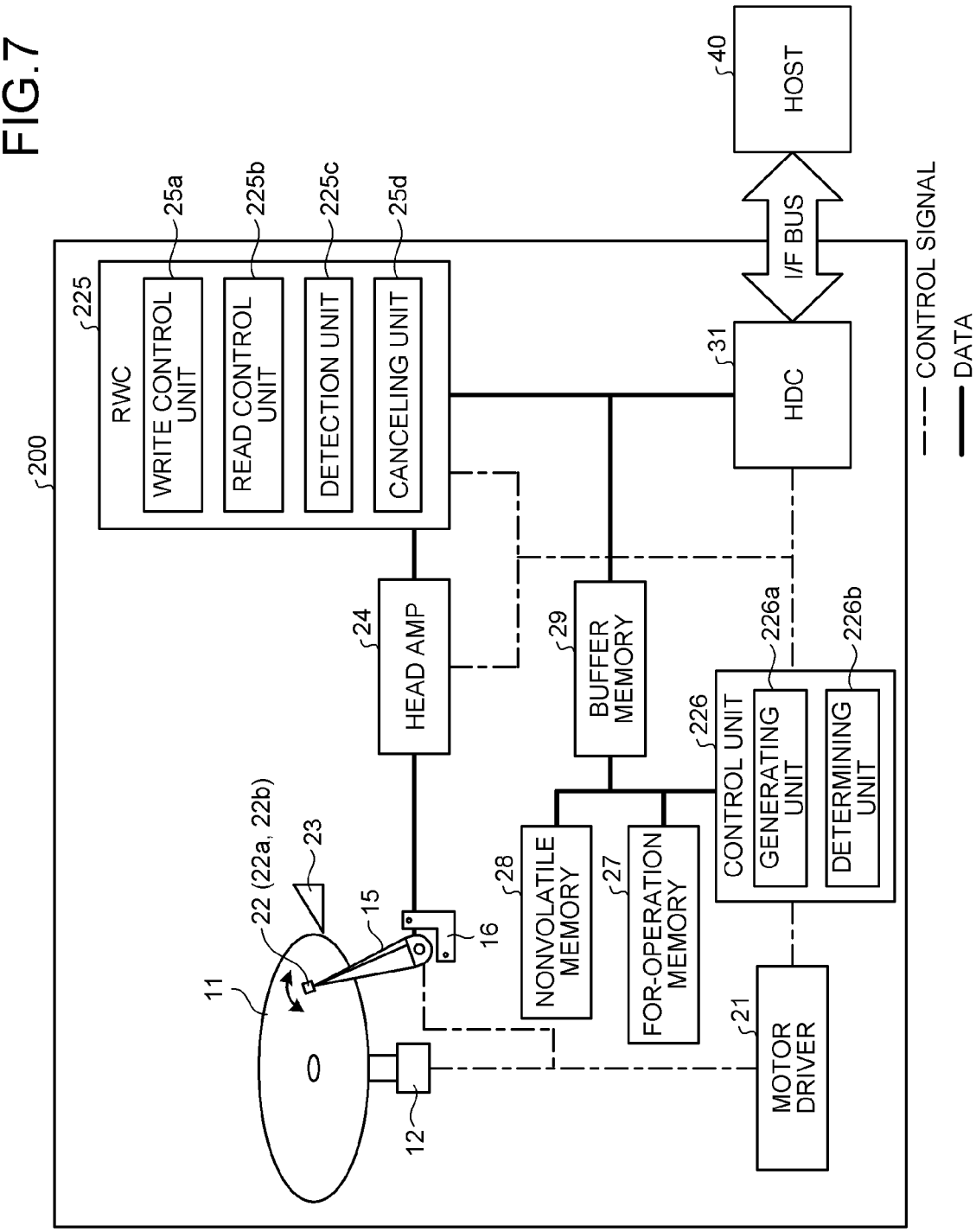
FIG. 7 is a diagram showing configuration of a disk apparatus according to a second embodiment.

Specifically, the disk apparatus 200 has a read/write channel 225 and a control unit 226 instead of the read/write channel 25 and control unit 26 (see FIG. 1) as shown in FIG. 7. FIG. 7 is a diagram showing the configuration of the disk apparatus 200.

The read/write channel 225 has the write control unit 25a, a read control unit 225b, a detection unit 225c, and a canceling unit 25d. The detection unit 225c, in cooperation with the read control unit 225b, distinctively detects a distance (Euclidean distance) indicating the degree of deviation from the ideal value of the sync mark of the target track and distances (Euclidean distances) indicating the degrees of deviation from the ideal values of the sync marks of the adjacent tracks at each detection position along a track width direction. For example, while the read control unit 225b changes the offset amount in the track width direction of the read head 22b, the detection unit 225c detects the distance of the sync mark of the target track and the distances of the sync marks of the adjacent tracks from the signal read by the read head 22b. The detection unit 225c supplies the detected results to the control unit 226.

The control unit 226 has a generating unit 226a and a determining unit 226b. The generating unit 226a receives the detected results of the detection unit 225c. The generating unit 226a generates an offset profile (see FIGS. 10 to 12) using the detected results of the detection unit 225c. The offset profile shows change in the detected distance according to the detection position along the track width direction for each of the sync mark of the target track and the sync marks of the adjacent tracks distinctively. The generating unit 226a supplies the generated offset profile to the determining unit 226b.

The determining unit 226b determines the offset position to which to make the read head 22b offset in a track width direction according to the offset profile generated by the generating unit 226a. The determining unit 226b supplies the determined result to the read control unit 225b. Accordingly, the read control unit 225b controls the read head 22b to read the signal from the target track while making the read head 22b located in the determined offset position.

Figure 8:
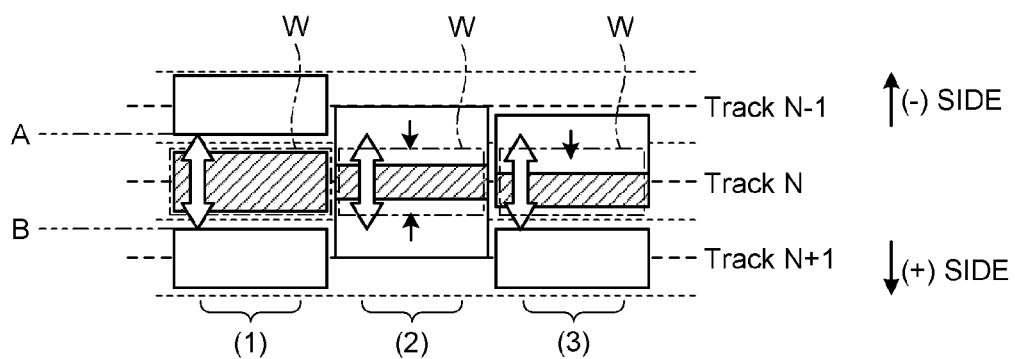
FIG. 8 is a diagram showing operation of the disk apparatus according to the second embodiment.

More specifically, as to the condition in which the sync mark of the target track and the sync marks of the adjacent tracks are written, for example, cases (1) to (3) shown in FIG. 8 can be thought of. FIG. 8 is a diagram showing the operation of the disk apparatus 200. FIG. 8 illustrates the case where track N is a target track. In FIG. 8, thin broken lines indicate boundaries between tracks, and thick broken lines indicate the center positions along the track width direction of the tracks.

Case (1) shows the condition in which the sync mark is written in the center of the track. Case (2) shows the condition in which the sync mark of the target track is partially overwritten from both sides. Case (3) shows the condition in which the sync mark of an adjacent track N−1 on the (−) side is pulled at one side and written partially over the sync mark of the target track N. In read retry for sectors whose track pitches have become locally narrower due to such side erase and one-side-pulled overwriting, pitch unevenness, and the like, the offset reading process which makes the read head 22b offset in a track width direction when reading signals is performed. For the purpose of determining an appropriate offset position (e.g., an optimum offset position), it is effective to measure an offset profile to search for an appropriate offset position (e.g., an optimum offset position).

Consider the case where in order to search for an appropriate offset position for a sector subject to reading, an offset profile is measured using a quality monitor value (QM value) such as VMM (Viterbi metric margin) or LLR (log likelihood ratio). In this case, if an appropriate offset position is determined to be the position at which the QM value is the best, because the QM value may take on the best at a position in the sync mark of an adjacent track pulled at one side and written partially over the target track as in cases (2) and (3), the error that a position on the adjacent track is determined to be an appropriate offset position may occur. This occurs because the QM monitor value merely indicates signal quality and because it is difficult to distinguish the signal quality of the target track and the signal quality of the adjacent track with using the QM monitor value.

Figure 9:
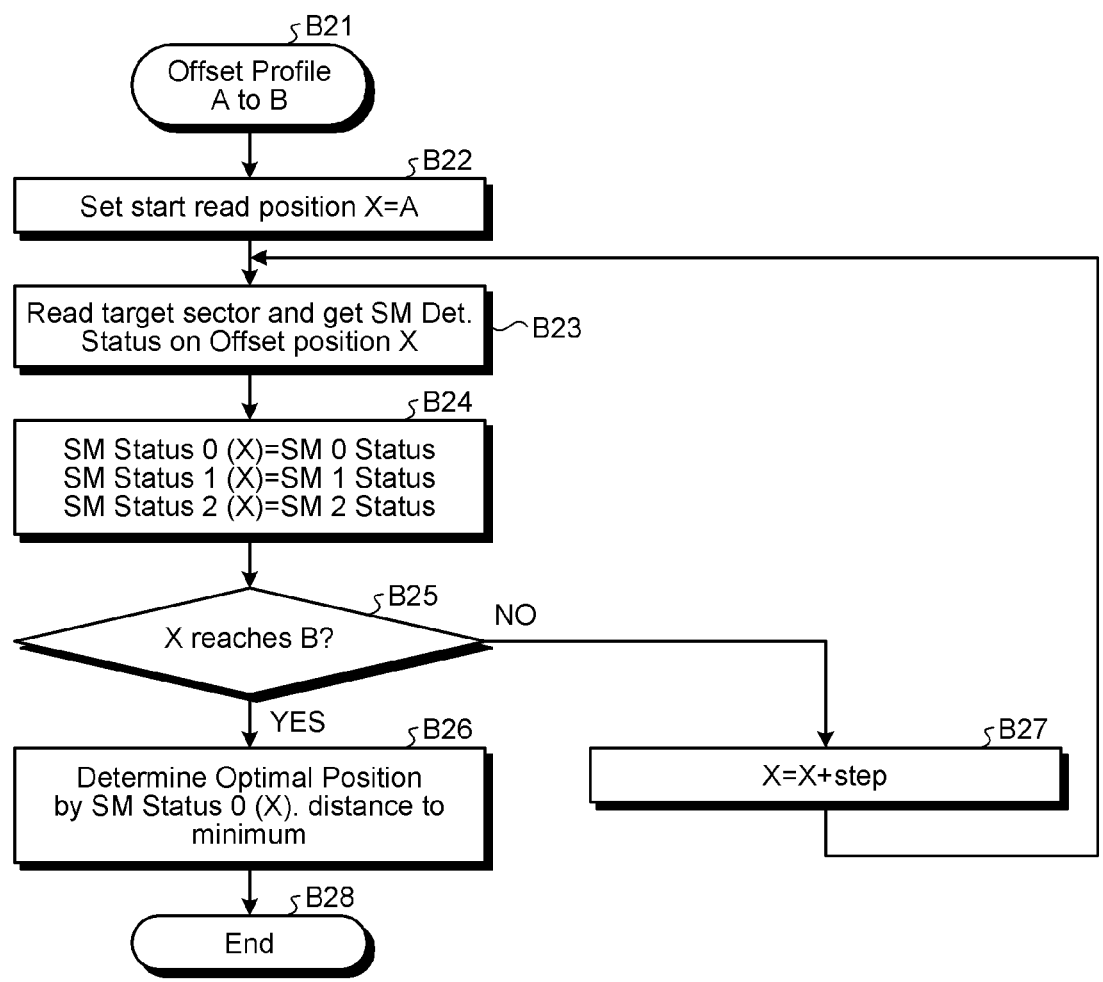
FIG. 9 is a flow chart showing operation of the disk apparatus according to the second embodiment.

The present embodiment carries out a search for an appropriate offset position with using the detected distance of the sync mark as shown in FIG. 9. FIG. 9 is a flow chart showing the operation of the disk apparatus 200 and shows the flow of measuring an offset profile of the detected distances of the sync marks.

The range for which to measure the profile is set to be from offset position A to offset position B (see FIG. 8) (B21), and the offset position X of the read head 22b is set to be at the offset position A (B22), and as in the first embodiment, the disk apparatus 200 reads a signal from the target track and generates the detection status 0, detection status 1, and detection status 2 by the sync mark detectors 25c1 to 25c3 (B23). The generating unit 226a stores the generated detection status 0, detection status 1, and detection status 2 in arrays SM Status0(X), SM Status1(X), and SM Status2(X) respectively (B24). In each of the arrays SM Status0(X), SM Status1(X), and SM Status2(X), a detection status (i.e., a detected distance) is stored as the element specified by a suffix denoting the offset position X (=A to B).

While locating the offset position X of the read head 22b by steps of a predetermined amount starting at the offset position A until the offset position X reaches the offset position B (during the time when No at B25) (B27), the disk apparatus 200 repeats B23, B24. When the offset position X reaches the offset position B (Yes at B25), the determining unit 226b determines an appropriate offset position according to the offset profile obtained in the form of the arrays SM Status0 (X), SM Status1(X), and SM Status2(X).

This example shows that the smaller the detected distance is, the better the signal quality is. Here, an appropriate offset position is determined to be the offset position at which the detected distance for the target sync mark is the smallest (B26).

Figure 10:
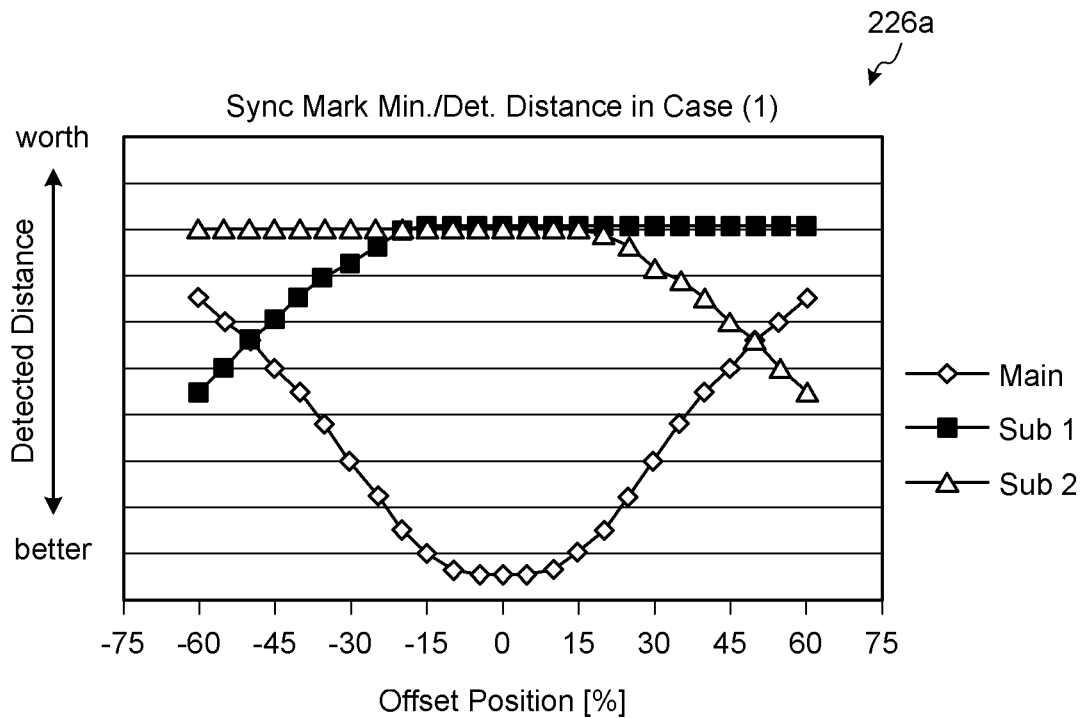
FIG. 10 is a graph showing an offset profile in the second embodiment.
Figure 11:
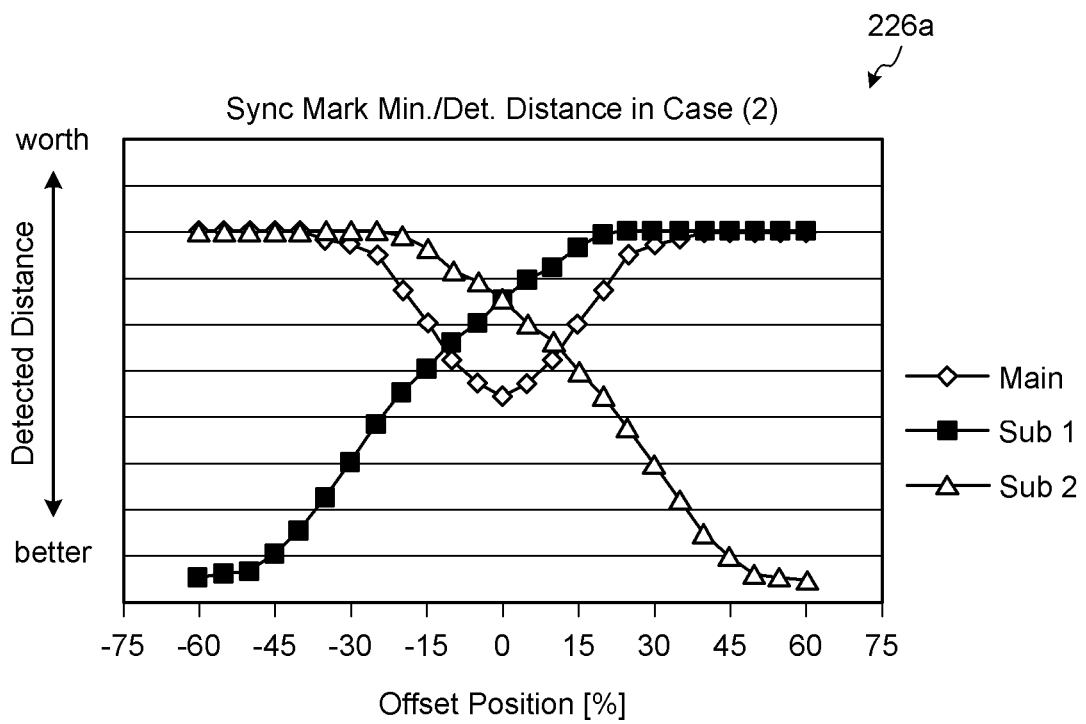
FIG. 11 is a graph showing an offset profile in the second embodiment.
Figure 12:
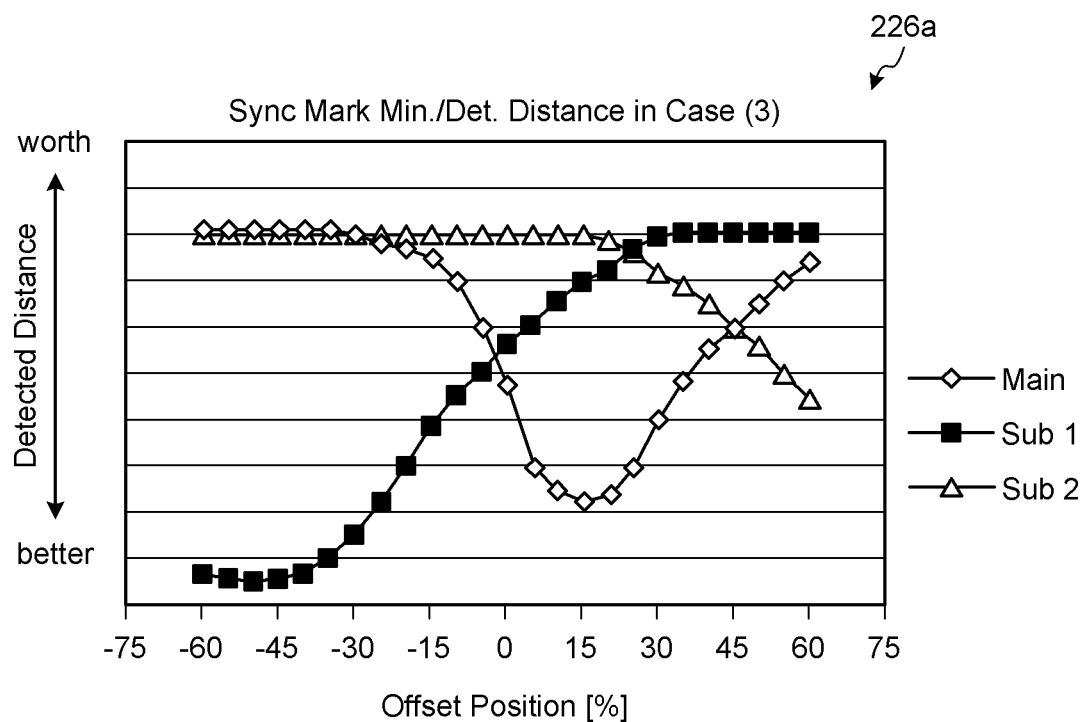
FIG. 12 is a graph showing an offset profile in the second embodiment.

FIGS. 10 to 12 show examples of the offset profile. FIG. 10 shows an offset profile obtained in the case (1), where the sync mark is written in the center position of the track. In the offset profile shown in FIG. 10, the profile of the target track (Main), the profile of the adjacent track on the outer side (Sub 1), and the profile of the adjacent track on the inner side (Sub 2) are shown distinguishably. In FIG. 10, the profile of the target track (Main) indicates that the center position (offset position≈0%) of the track is an appropriate offset position. Referring to the offset profile shown in FIG. 10, the determining unit 226b can determine that the center position (offset position≈0%) of the track is an appropriate offset position.

FIG. 11 shows an offset profile obtained in the case (2), where the sync mark of the target track is partially overwritten from both sides. In the offset profile shown in FIG. 11, the profile of the target track (Main), the profile of the adjacent track on the outer side (Sub 1), and the profile of the adjacent track on the inner side (Sub 2) are shown distinctively. In FIG. 11, the profile of the target track (Main) indicates that the center position (offset position≈0%) of the track is an appropriate offset position. Referring to the offset profile shown in FIG. 11, the determining unit 226b can determine that the center position (offset position≈0%) of the track is an appropriate offset position.

FIG. 12 shows an offset profile obtained in the case (3), where the sync mark of an adjacent track N−1 on the (−) side is pulled at one side and written partially over the sync mark of the target track N. In the offset profile shown in FIG. 12, the profile of the target track (Main), the profile of the adjacent track on the outer side (Sub 1), and the profile of the adjacent track on the inner side (Sub 2) are shown distinguishably. In FIG. 12, the profile of the target track (Main) indicates that a position offset outward (offset position≈15%) in the track is an appropriate offset position. Referring to the offset profile shown in FIG. 12, the determining unit 226b can determine that the position offset outward (offset position≈15%) in the track is an appropriate offset position.

As such, reading to search for a bottom in the profile of the target track can determine an appropriate offset position correctly. If an appropriate offset position is determined, the process finishes (B28).

As described above, in the second embodiment, in the disk apparatus 200, the detection unit 225c distinctively detects a distance indicating the degree of deviation from the ideal value of the sync mark of the target track and distances indicating the degrees of deviation from the ideal values of the sync marks of the adjacent tracks at each detection position along a track width direction. The generating unit 226a generates an offset profile, which shows change in the detected distance according to the detection position along the track width direction for each of the sync mark of the target track and the sync marks of the adjacent tracks distinctively. The determining unit 226b determines the offset position to which to make the read head 22b offset in the track width direction according to the offset profile generated in the generating unit 226a. Thus, even if the sync mark of the target track is partially overwritten from an adjacent track, the profile of the target track and the profiles of the adjacent tracks can be distinctively found out. As a result, an appropriate offset position can be correctly determined from the profile of the target track, and hence the offset reading process can be correctly performed, and thus accuracy in detecting sync marks can be further improved.

Figure 13:
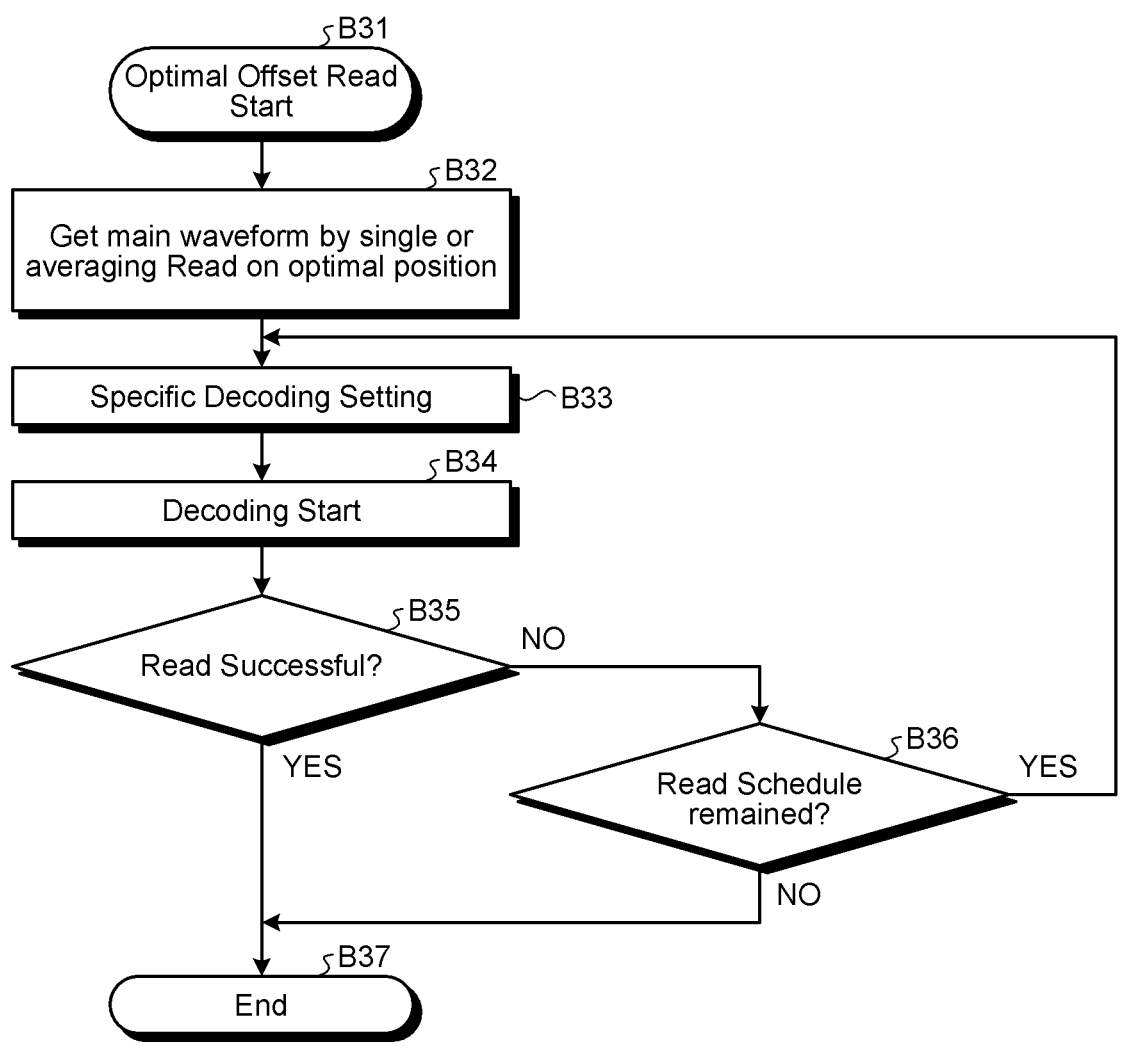
FIG. 13 is a flow chart showing operation of a disk apparatus according to a modified example of the second embodiment.

It should be noted that the offset reading process may be combined with another retry process. For example, the offset reading process may be combined with an averaging retry process shown in FIG. 13. In carrying out the averaging retry process, it is effective to form the reading process at an appropriate offset position at which a signal subject to reading can be read with good quality. FIG. 13 is a flow chart showing the operation of the disk apparatus 200 which is performed after B28 shown in FIG. 9.

First, signal samples to be used in decoding are obtained by reading at the determined appropriate offset position (e.g., an optimum offset position) (B31). At this offset position, either one-time reading is performed or, when combined with the averaging retry, the reading is performed a specified number of times, so that resultant signals are averaged (B32). For the obtained signal samples, decoding setting (MDD detection setting, LLR erasure, decoder LLR scaling setting, DDNP setting, etc.) that matches a read schedule is performed (B33), and decoding is performed (B34). These steps B33, B34 are repeated until reading succeeds (during the time when No at B35) or until the read schedule finishes (during the time when Yes at B36). If reading succeeds (Yes at B35), or the read schedule finishes (No at B36), the process ends (B37).

Or the offset reading process may be combined with, e.g., the ITI canceling process. By making the degree of influence of adjacent tracks found out through the offset profile be reflected in the ITI canceling process, the success rate of the ITI canceling process can be improved. That is, the accuracy of the ITI canceling process can be improved by changing gain and the thing subject to the canceling process (either interference components from both sides or an interference component from one side to be cancelled) when obtaining the interference components with taking into account the degree of influence of adjacent tracks.

Figure 14:
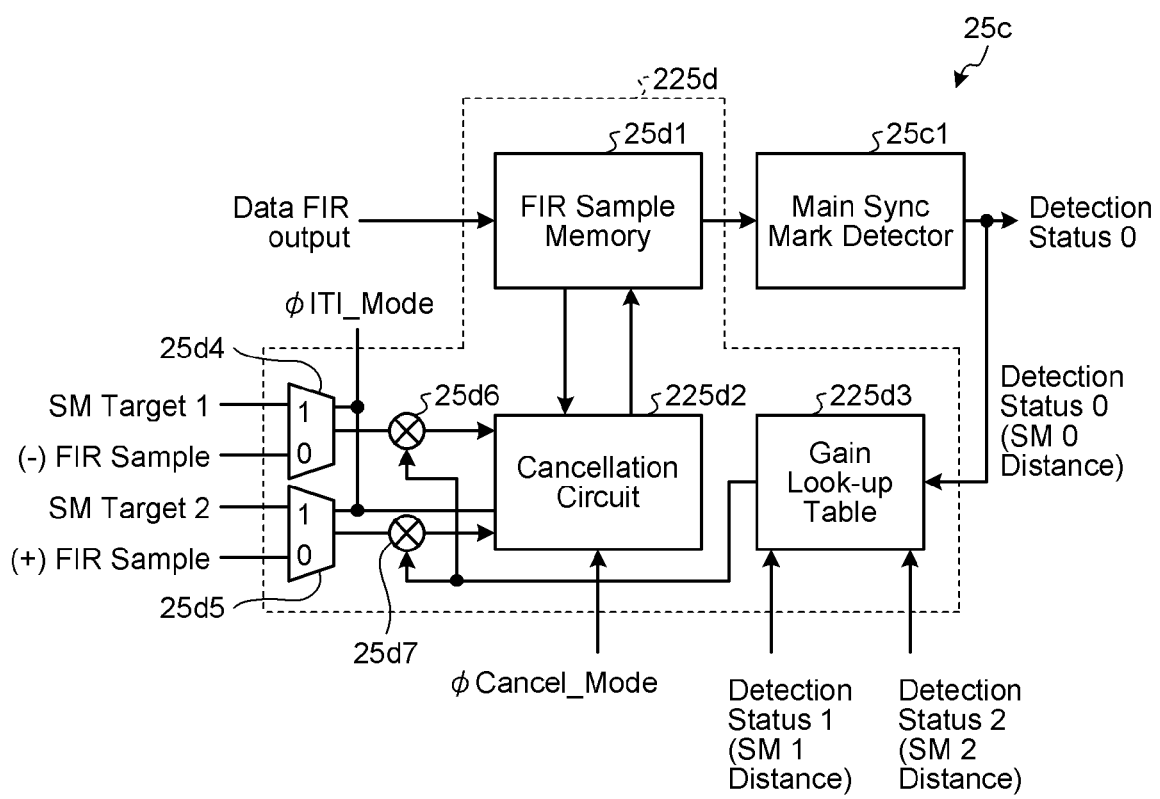
FIG. 14 is a diagram showing configuration of a canceling unit in the modified example of the second embodiment.

Specifically, as shown in FIG. 14, the canceling unit 225d has a canceling circuit 225d2 and a gain lookup table 225d3 instead of the canceling circuit 25d2 and the gain lookup table 25d3 shown in FIG. 4. FIG. 14 is a diagram showing the configuration of the canceling unit 225d.

The gain lookup table 225d3 receives the detected result (detection status 0) of the sync mark detector 25c1 as well as the detected result (detection status 1) of the sync mark detector 25c2 and the detected result (detection status 2) of the sync mark detector 25c3. In the gain lookup table 225d3, for multiple combinations of a candidate value for the detection status 0, a candidate value for the detection status 1, and a candidate value for the detection status 2, gain coefficients are associated with the values of 'detection status 1'/'detection status 0' and of 'detection status 2'/'detection status 0'. That is, in the gain lookup table 225d3, the combination of the value of 'detection status 1'/'detection status 0' indicating the degree of influence of the adjacent track on the outer side and the value of 'detection status 2'/'detection status 0' indicating the degree of influence of the adjacent track on the inner side determines the gain coefficients. The gain lookup table 225d3 supplies the determined gain coefficients to the multipliers 25d6, 25d7.

The canceling circuit 225d2 receives the signal read from the target track from the memory 25d1, the interference component from the adjacent track on the outer side from the multiplier 25d6, and the interference component from the adjacent track on the inner side from the multiplier 25d7. The canceling circuit 225d2 determines which of the both-side ITI canceling process, (+) side ITI canceling process, and (−) side ITI canceling process to perform according to a cancellation mode signal φCancel_Mode.

The cancellation mode signal φCancel_Mode is a signal determined by the control unit 226 based on the degree of influence of the adjacent track on the outer side ((−) side) ('detection status 1'/'detection status 0') and the degree of influence of the adjacent track on the inner side ((+) side) ('detection status 2'/'detection status 0'). For example, the control unit 226 generates the cancellation mode signal φCancel_Mode based on 'detection status 1'/'detection status 0' and 'detection status 2'/'detection status 0', so as to have the canceling circuit 225d2 perform the both-side ITI canceling process when determining that interference from the adjacent tracks on opposite sides is stronger than a permissible range, the (+) side ITI canceling process when determining that interference from the adjacent track on the inner side ((+) side) is stronger than a permissible range, and the (−) side ITI canceling process when determining that interference from the adjacent track on the outer side ((−) side) is stronger than a permissible range, and supplies to the canceling circuit 225d2. The canceling circuit 225d2 performs the ITI canceling process according to the cancellation mode signal φCancel_Mode supplied. The canceling circuit 225d2 returns the signal after the ITI canceling process to the memory 25d1. Thus, the signal after the ITI canceling process is supplied to the sync mark detector 25c1.

Figure 15:
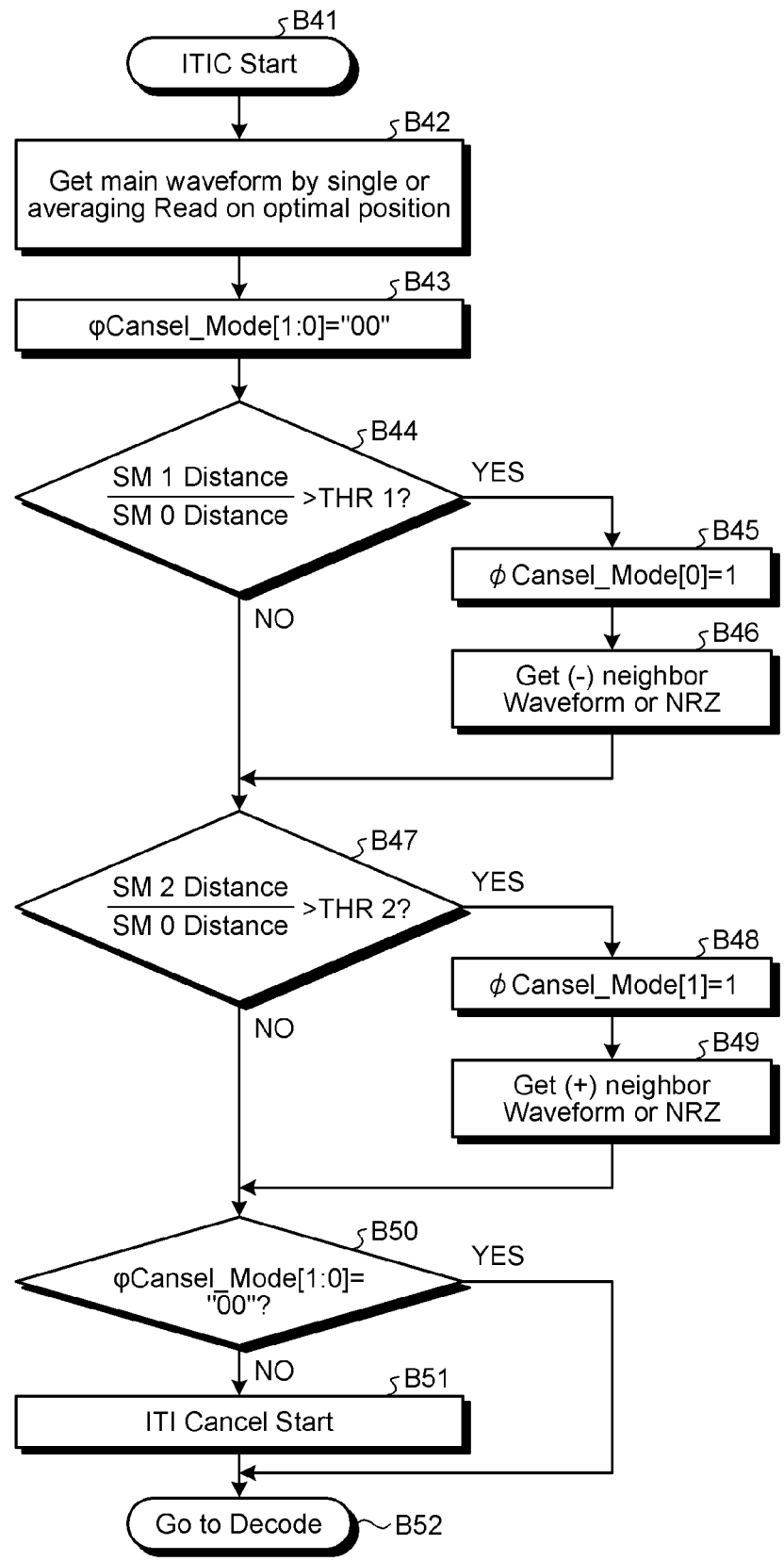
FIG. 15 is a flow chart showing operation of a disk apparatus according to the modified example of the second embodiment.

The ITI canceling process is carried out according to the procedure shown in FIG. 15. FIG. 15 is a flow chart showing the operation of the disk apparatus 200.

First, signal samples to be used in decoding are obtained by reading at the determined appropriate offset position (e.g., an optimum offset position) (B41). At this offset position, either one-time reading is performed or, when combined with the averaging retry, the reading is performed a specified number of times, so that resultant signals are averaged (B42). The cancellation mode signal φCancel_Mode [1:0] is set to an initial value "00" (B43). The cancellation mode signal φCancel_Mode [1:0] indicates cancellation execution flags of the (+) side and (−) side.

The disk apparatus 200 determines whether the ratio of the detected distance of the sync mark SM1 of the adjacent track on the outer side ((−) side) to the detected distance of the sync mark SM0 of the target track (SM1 distance/SM0 distance) exceeds a threshold THR1 (B44). If the ratio 'SM1 distance'/'SM0 distance' is less than or equal to threshold THR1 (No at B44), the disk apparatus 200 determines that interference from the outer side ((−) side) is within a permissible range, and the process proceeds to B47.

If the ratio 'SM1 distance'/'SM0 distance' exceeds threshold THR1 (Yes at B44), the disk apparatus 200 determines that interference from the outer side ((−) side) is stronger than the permissible range, sets the (−) side cancellation execution flag φCancel_Mode [0] to 1 (execution) (B45), performs reading of data adjacent on the (−) side, and holds an NRZ pattern or signal sample values (B46).

Then the disk apparatus 200 determines whether the ratio of the detected distance of the sync mark SM2 of the adjacent track on the inner side ((+) side) to the detected distance of the sync mark SM0 of the target track ('SM2 distance'/'SM0 distance') exceeds a threshold THR2 (B47). If the ratio 'SM2 distance'/'SM0 distance' is less than or equal to threshold THR2 (No at B47), the disk apparatus 200 determines that interference from the inner side ((+) side) is within a permissible range, and the process proceeds to B50

If the ratio 'SM2 distance'/'SM0 distance' exceeds threshold THR2 (Yes at B47), the disk apparatus 200 determines that interference from the inner side ((+) side) is stronger than the permissible range, sets the (+) side cancellation execution flag φCancel_Mode [1] to 1 (execution) (B48), performs reading of data adjacent on the (+) side, and holds an NRZ pattern (target values) or signal sample values (the read signal) (B49).

Referring to the cancellation mode signal φCancel_Mode [1:0] (B50), if it remains at the initial value "00" (Yes at B50), the disk apparatus 200 determines that the ITI canceling process need not be performed, and thus the process proceeds to decoding (B52). If the cancellation mode signal φCancel_Mode [1:0] differs from the initial value "00" (No at B50), the disk apparatus 200 performs the ITI canceling process according to the specified flag (B51). For example, the canceling circuit 225d2 performs the both-side ITI canceling process if φCancel_Mode [1:0]="11", the (−) side ITI canceling process if φCancel_Mode [1:0]="01", and the (+) side ITI canceling process if φCancel_Mode [1:0]="10". The disk apparatus 200 performs decoding on signal samples after the canceling (B52).

As such, by using the detected distance of the sync mark of the target track and the detected distances of the sync marks of the adjacent tracks that have been distinctively detected from the signal of the target track, the disk apparatus 200 can evaluate to what degree the signal component denoting the sync mark of the target track in the signal of the target track has been influenced by the interference components denoting the sync marks of the adjacent tracks. Thus, the ITI canceling process that matches the condition of a data sector subject to reading in the target track can be performed.

Third Embodiment

Next, a disk apparatus 300 according to the third embodiment will be described. With description of similar configuration to in the first embodiment being simplified or omitted, description will be made below focusing on different configurations.

The disk apparatus 300 evaluates the degrees of influence of the adjacent tracks from the detected results of the detection unit 25c, thereby monitoring side-erase degradation to perform processing according to the monitoring result.

Figure 16:
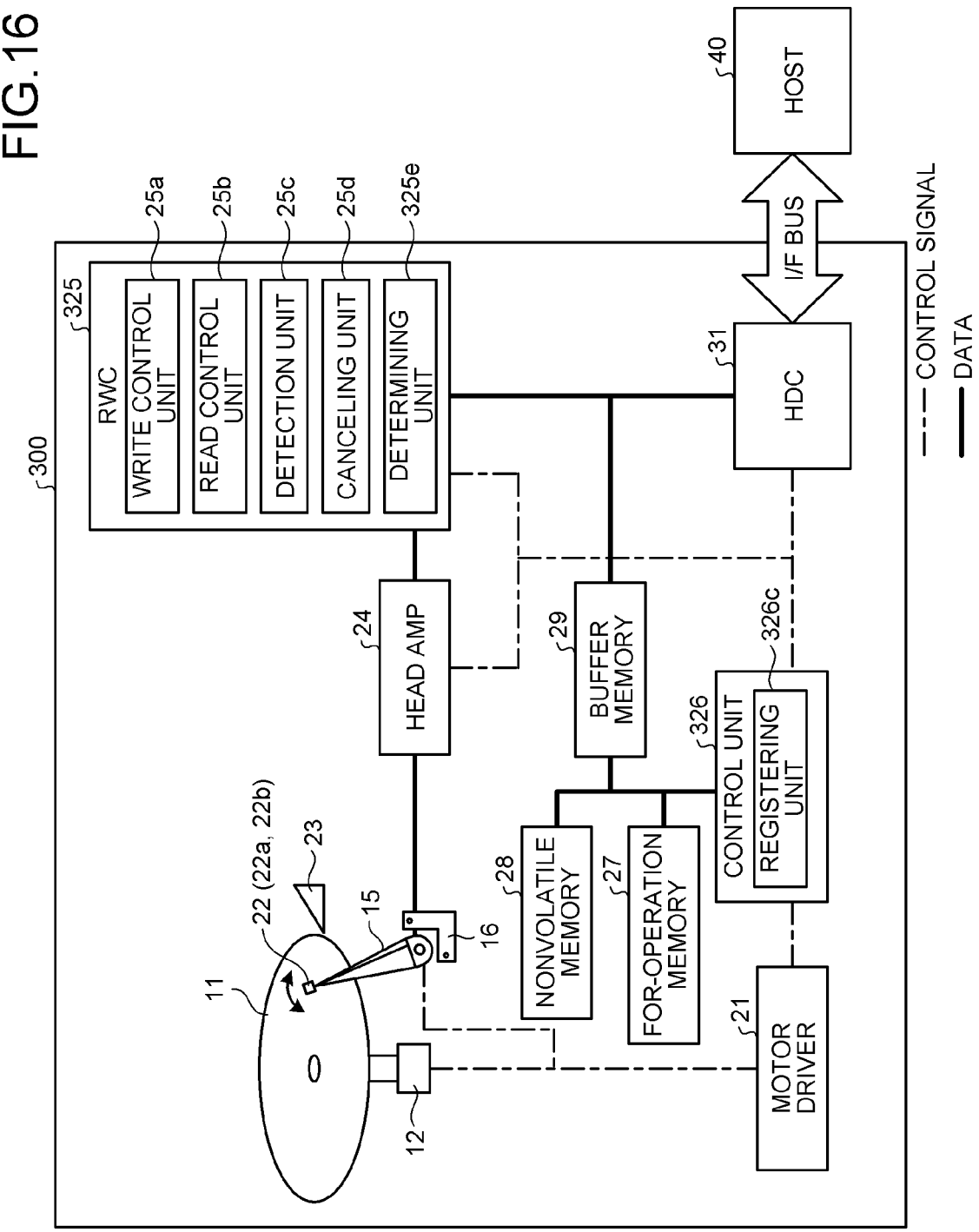
FIG. 16 is a diagram showing configuration of a disk apparatus according to a third embodiment.

Specifically, as shown in FIG. 16, the disk apparatus 300 has a read/write channel 325 and a control unit 326 instead of the read/write channel 25 and control unit 26 shown in FIG. 1. The read/write channel 325 has a determining unit 325e. The determining unit 325e determines whether side erase is present according to the ratios of the detected distance indicating the degree of deviation from the ideal value of the sync mark of the target track to the detected distances indicating the degrees of deviation from the ideal values of the sync marks of the adjacent tracks. The determining unit 325e supplies the determined result to the control unit 326.

Figure 17:
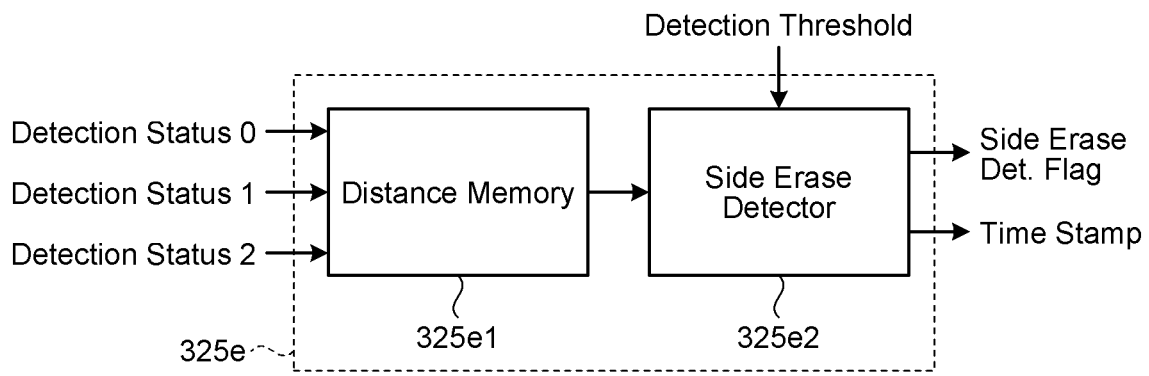
FIG. 17 is a diagram showing configuration of a determining unit in the third embodiment.

For example, the determining unit 325e may be configured as shown in FIG. 17. The determining unit 325e has a distance memory 325e1 and a side erase detector 325e2. The distance memory 325e1 receives the detected distance "detection status 0" of the sync mark of the target track, the detected distance "detection status 1" of the sync mark of the adjacent track on the outer side, and the detected distance "detection status 2" of the sync mark of the adjacent track on the inner side from the sync mark detectors 25c1 to 25c3 (see FIG. 3) and stores them therein.

The side erase detector 325e2 receives a threshold THR from the control unit 326 and in parallel with this, reads the detected distance "detection status 0" of the sync mark of the target track, the detected distance "detection status 1" of the sync mark of the adjacent track on the outer side, and the detected distance "detection status 2" of the sync mark of the adjacent track on the inner side from the distance memory 325e1. The side erase detector 325e2 calculates the value of 'detection status 1'/'detection status 0' and the value of 'detection status 2'/'detection status 0' to compare with the threshold THR. If at least one of the value of 'detection status 1'/'detection status 0' and the value of 'detection status 2'/'detection status 0' exceeds the threshold THR, the side erase detector 325e2 determines that side erase is present to output a side erase detection flag and its sync mark position. It should be noted that the determining unit 325e may be implemented as a functional module that is executed by firmware for control, instead of being constituted by a circuit.

When the side erase detection flag is raised, the write control unit 25a determines that the signal of the sync mark of the target track is side erased by the sync mark of an adjacent track and performs refresh processing. The write control unit 25a controls the recording head 22a to perform data refresh for the track on which side erase is determined to be present. That is, the write control unit 25a controls the recording head 22a to write data again onto the track on which side erase is determined to be present.

Figure 18:
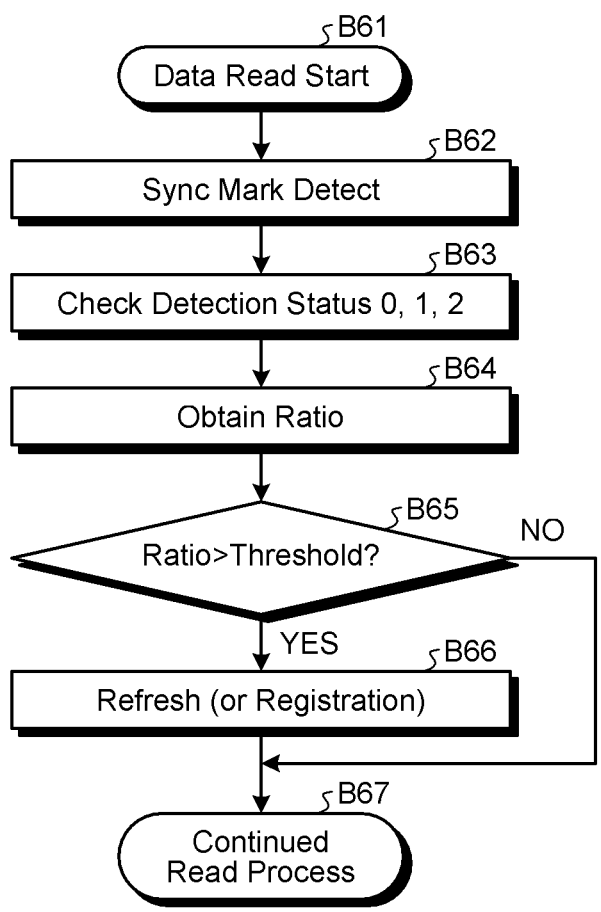
FIG. 18 is a flow chart showing operation of the disk apparatus according to the third embodiment.

Further, the disk apparatus 300 performs operation as shown in FIG. 18. FIG. 18 is a flow chart showing the operation of the disk apparatus 300.

When the disk apparatus 300 starts reading data (B61), it detects each of the sync mark of the target track and the sync marks of the adjacent tracks from the signal read from the target track (B62). The disk apparatus 300 reads the detected distance "detection status 0" of the sync mark of the target track, the detected distance "detection status 1" of the sync mark of the adjacent track on the outer side, and the detected distance "detection status 2" of the sync mark of the adjacent track on the inner side from the distance memory 325e1 (B63).

The disk apparatus 300 calculates the value of 'detection status 1'/'detection status 0' and the value of 'detection status 2'/'detection status 0' (B64). The disk apparatus 300 compares each of the value of 'detection status 1'/'detection status 0' and the value of 'detection status 2'/'detection status 0' with the threshold THR (B65). If both the value of 'detection status 1'/'detection status 0' and the value of 'detection status 2'/'detection status 0' are less than or equal to threshold THR (No at B65), then the disk apparatus 300 determines that side erase is not present and continues reading (B67).

If at least one of the value of 'detection status 1'/'detection status 0' and the value of 'detection status 2'/'detection status 0' exceeds threshold THR (Yes at B65), then the disk apparatus 300 determines that side erase is present and outputs the side erase detection flag and its sync mark position. The disk apparatus 300 performs data refresh for the track on which side erase is determined to be present (B66).

As described above, in the third embodiment, in the disk apparatus 300, the determining unit 325e determines whether side erase is present according to the ratios of the detected distance indicating the degree of deviation from the ideal value of the sync mark of the target track to the detected distances indicating the degrees of deviation from the ideal values of the sync marks of the adjacent tracks. The write control unit 25a controls the recording head 22a to perform data refresh for the track on which side erase is determined to be present. Thus, refresh processing can be performed selectively for the track on which side erase has occurred in a data sector subject to reading, so that refresh processing can be performed efficiently.

It should be noted that registration processing may be performed instead of refresh processing as processing in the case where side erase is determined to be present. That is, because the place where side erase is present is locally weak in side-erase tolerance, by registering the place as a defect not to use, side-erase tolerance can be improved. For example, the control unit 326 may have a registering unit 326c as shown in FIG. 16. The registering unit 326c receives the side erase detection flag and its sync mark position as the determined result of the determining unit 325e. The registering unit 326c generates defect information in which the side erase detection flag is associated with its sync mark position to write onto a management information area of the magnetic disk 11 (B66 in FIG. 18).

Figure 19:
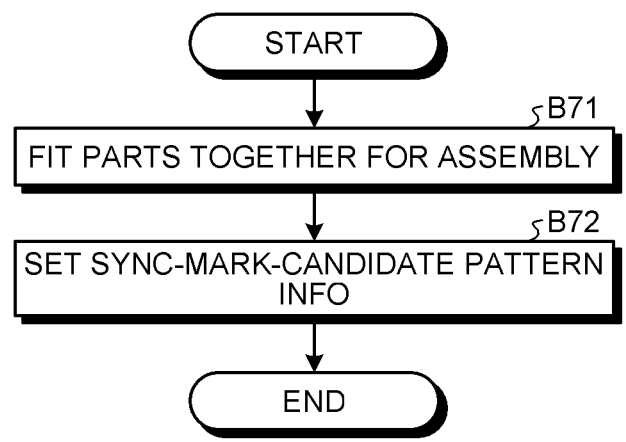
FIG. 19 is a flow chart showing a manufacturing method of the disk apparatuses according to the first to third embodiments.

Next, a manufacturing method of the disk apparatuses according to the first to third embodiments will be described using FIG. 19. FIG. 19 is a flow chart showing the manufacturing method of the disk apparatuses. First, components are fit together to assemble the disk apparatus (see FIGS. 1, 7, 16) (B71). Then, sync-mark-candidate pattern information including three or more different types of patterns (bit patterns) of the sync mark SM to be used when writing data by the recording head 22a is written onto the management information area of the magnetic disk 11 to be set (B72).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller comprising:
a write control unit configured to control to, when writing data onto data regions of a magnetic disk, write sync marks to signify beginnings of the data regions such that the sync marks are periodically made different from each other for each neighboring tracks; and
a detection unit configured to detect a first sync corresponding to target track in a signal read from the target track and a second sync mark corresponding to an adjacent track adjacent to the target track, respectively, and to distinctively detect a distance indicating degree of deviation from an ideal value of the first sync mark and a distance indicating degree of deviation from an ideal value of the second sync mark, at each detection position along a track width direction.

2. The controller according to claim 1, further comprising:
a canceling unit configured to cancel an interference component corresponding to the second sync mark from a signal corresponding to the first sync mark according to the detected result of the detection unit.

3. The controller according to claim 2, wherein
the canceling unit removes an interference component obtained from a target for the second sync mark from the signal corresponding to the first sync mark.

4. The controller according to claim 2, wherein
the canceling unit removes an interference component obtained from a signal read from the adjacent track and corresponding to the second sync mark, from the signal corresponding to the first sync mark.

5. The controller according to claim 1, further comprising:
a determining unit configured to determine whether side erase is present according to ratio of the detected distance of the first sync mark to the detected distance of the second sync mark.

6. A disk apparatus comprising:
a magnetic disk having data regions;
a magnetic head configured to write data onto the data regions;
a write control unit configured to control the magnetic head to, when writing data onto data regions of a magnetic disk, write sync marks to signify beginnings of the data regions such that the sync marks are periodically made different from each other for each neighboring tracks; and
a detection unit configured to detect a first sync corresponding to target track in a signal read by the magnetic head from the target track and a second sync mark corresponding to an adjacent track adjacent to the target track, respectively, and to distinctively detect a distance indicating degree of deviation from an ideal value of the first sync mark and a distance indicating degree of deviation from an ideal value of the second sync mark, at each detection position along a track width direction.

7. The disk apparatus according to claim 6, further comprising:
a canceling unit configured to cancel an interference component corresponding to the second sync mark from a signal corresponding to the first sync mark according to the detected result of the detection unit.

8. The disk apparatus according to claim 7, wherein
the canceling unit removes an interference component obtained from a target for the second sync mark from the signal corresponding to the first sync mark.

9. The disk apparatus according to claim 7, wherein
the canceling unit removes an interference component obtained from a signal read from the adjacent track and corresponding to the second sync mark, from the signal corresponding to the first sync mark.

10. The disk apparatus according to claim 6, further comprising:
a generating unit configured to generate an offset profile that shows change in the detected distance according to the detection position along the track width direction for each of the first sync mark and the second sync mark distinctively.

11. The disk apparatus according to claim 10, further comprising:
a determining unit configured to determine an offset position to be offset the magnetic head in a track width direction according to the generated offset profile.

12. The disk apparatus according to claim 11, further comprising:
a read control unit configured to control the magnetic head to read a signal from the target track while positioning the magnetic head in the determined offset position.

13. The disk apparatus according to claim 12, further comprising:
a canceling unit configured to, according to the detected result of the detection unit, cancel an interference component corresponding to the second sync mark from a signal corresponding to the first sync mark and read by the magnetic head from the target track with the magnetic head being positioned in the determined offset position.

14. The disk apparatus according to claim 6, further comprising:
a determining unit configured to determine whether side erase is present according to ratio of a detected distance indicating degree of deviation from an ideal value of the first sync mark to a detected distance indicating degree of deviation from an ideal value of the second sync mark, wherein the write control unit controls the magnetic head to perform data refresh for a track on which side erase is determined to be present.

15. The disk apparatus according to claim 6, further comprising:
a determining unit configured to determine whether side erase is present according to ratio of a detected distance indicating degree of deviation from an ideal value of the first sync mark to a detected distance indicating degree of deviation from an ideal value of the second sync mark; and
a registering unit configured to register information of a track on which side erase is determined to be present.

16. A control method of a disk apparatus which accesses a magnetic disk by a magnetic head, comprising:
controlling the magnetic head to, when writing data onto data regions of the magnetic disk, write sync marks to signify beginnings of the data regions such that the sync marks are periodically made different from each other for each neighboring tracks;
detecting a first sync mark corresponding to target track in a signal read by the magnetic head from the target track and a second sync mark corresponding to a track adjacent to the target track, respectively; and
distinctively detecting a distance indicating degree of deviation from an ideal value of the first sync mark and a distance indicating degree of deviation from an ideal value of the second sync mark, at each detection position along a track width direction.

17. The control method according to claim 16, further comprising:
canceling an interference component corresponding to the second sync mark from a signal corresponding to the first sync mark according to the detected first and second sync mark.

18. The control method according to claim 17, further comprising:
removing an interference component obtained from a target for the second sync mark from the signal corresponding to the first sync mark.

19. The control method according to claim 17, further comprising:
removing an interference component obtained from a signal read from the adjacent track and corresponding to the second sync mark, from the signal corresponding to the first sync mark.

20. The control method according to claim 16, further comprising:
determining whether side erase is present according to ratio of the detected distance of the first sync mark to the detected distance of the second sync mark.

* * * * *